(12) United States Patent
Ahammer et al.

(10) Patent No.: US 10,941,005 B2
(45) Date of Patent: Mar. 9, 2021

(54) METHOD FOR SORTING CONVEYED OBJECTS ON A CONVEYOR SYSTEM USING TIME CONTROL

(71) Applicant: TGW LOGISTICS GROUP GMBH, Marchtrenk (AT)

(72) Inventors: Christian Ahammer, Gunskirchen (AT); Harald Johannes Schroepf, Wels (AT)

(73) Assignee: TGW LOGISTICS GROUP GMBH, Marchtrenk (AT)

( * ) Notice: Subject to any disclaimer, the term of this patent is extended or adjusted under 35 U.S.C. 154(b) by 118 days.

(21) Appl. No.: 16/064,030

(22) PCT Filed: Dec. 21, 2016

(86) PCT No.: PCT/EP2016/082091
§ 371 (c)(1),
(2) Date: Aug. 23, 2018

(87) PCT Pub. No.: WO2017/108900
PCT Pub. Date: Jun. 29, 2017

(65) Prior Publication Data
US 2019/0004503 A1 Jan. 3, 2019

(30) Foreign Application Priority Data

Dec. 21, 2015 (AT) .............................. A 51087/2015

(51) Int. Cl.
B65G 43/10 (2006.01)
B65G 43/08 (2006.01)
(Continued)

(52) U.S. Cl.
CPC .............. B65G 43/10 (2013.01); B65G 43/00 (2013.01); B65G 43/08 (2013.01); B65G 47/681 (2013.01);
(Continued)

(58) Field of Classification Search
CPC ....... B65G 43/10; B65G 47/681; B65G 43/08
See application file for complete search history.

(56) References Cited

U.S. PATENT DOCUMENTS 2,441,469 A * 5/1948 Cameron ............. B65G 47/681
198/524
3,223,225 A * 12/1965 Clark ................... B65G 47/681
198/357
(Continued)

FOREIGN PATENT DOCUMENTS

CN 1733575 A 2/2006
CN 201169390 Y 12/2008
(Continued)

OTHER PUBLICATIONS

International Search Report of PCT/EP2016/082091, dated May 16, 2017.
(Continued)

Primary Examiner — Thomas Randazzo
(74) Attorney, Agent, or Firm — Collard & Roe, P.C.

(57) ABSTRACT

In a first step of a method for bundling conveying streams on a material handling element including a number of incoming conveyor segments, at least one coupling to an outgoing conveyor segment, on which the incoming conveyor segments converge, and a number of holding devices for holding a conveying stream on the incoming conveyor segments, target arrival times, at which the objects arrive as planned at a destination, are calculated for the conveyed objects. A conveyed object is released at a release time which substantially corresponds to the target arrival time minus the target pass-through time required for the conveyed object to be transported as planned from a current position to the destination. A material handling element carries out the method.

24 Claims, 15 Drawing Sheets

(51) Int. Cl.
*G05B 19/418* (2006.01)
*B65G 47/68* (2006.01)
*B65G 43/00* (2006.01)

(52) U.S. Cl.
CPC .......... *G05B 19/4189* (2013.01); *G05B 2219/31272* (2013.01); *G05B 2219/31273* (2013.01); *G05B 2219/31274* (2013.01); *G05B 2219/31277* (2013.01); *Y02P 90/02* (2015.11)

(56) References Cited

U.S. PATENT DOCUMENTS

| | | | | |
|---|---|---|---|---|
| 3,270,861 | A * | 9/1966 | Reed | B65G 47/681 198/779 |
| 3,747,781 | A * | 7/1973 | Daigle | B65G 47/50 198/463.3 |
| 4,249,661 | A * | 2/1981 | Lem | B65G 47/54 209/564 |
| 4,265,356 | A * | 5/1981 | Glover | B65G 47/681 198/444 |
| 5,501,571 | A * | 3/1996 | Van Durrett | G05B 19/4189 414/801 |
| 5,733,098 | A | 3/1998 | Lyon et al. | |
| 9,555,978 | B1 * | 1/2017 | Hanssen | B65G 1/1378 |
| 10,239,704 | B2 * | 3/2019 | Messner | B65G 1/0492 |
| 2002/0179502 | A1 * | 12/2002 | Cerutti | B65G 47/52 209/583 |
| 2004/0193311 | A1 | 9/2004 | Winkler | |
| 2004/0254674 | A1 * | 12/2004 | Nojo | G05B 19/4189 700/213 |
| 2007/0129843 | A1 * | 6/2007 | Lupton | B65G 43/10 700/223 |
| 2009/0065330 | A1 * | 3/2009 | Lupton | B65G 43/08 198/357 |
| 2009/0099686 | A1 * | 4/2009 | Yoshikawa | B65G 37/02 700/228 |
| 2010/0122942 | A1 * | 5/2010 | Harres | B07C 3/00 209/584 |
| 2011/0301745 | A1 * | 12/2011 | Culp | B07C 5/3412 700/215 |
| 2012/0057479 | A1 | 3/2012 | Maruyama et al. | |
| 2012/0222992 | A1 | 9/2012 | Girodet et al. | |
| 2014/0142747 | A1 * | 5/2014 | Magato | B65G 47/681 700/230 |
| 2015/0104286 | A1 * | 4/2015 | Hansl | B65G 37/00 414/800 |
| 2015/0336741 | A1 * | 11/2015 | Ahammer | B65G 1/0485 414/281 |

FOREIGN PATENT DOCUMENTS

| | | |
|---|---|---|
| CN | 101446824 A | 6/2009 |
| CN | 102639414 A | 8/2012 |
| CN | 102968100 A | 3/2013 |
| CN | 103037986 A | 4/2013 |
| CN | 103403193 A | 11/2013 |
| CN | 203287937 U | 11/2013 |
| CN | 105523372 A | 4/2016 |
| DE | 10 2007 010 191 A1 | 9/2008 |
| EP | 0 697 351 A1 | 2/1996 |
| EP | 0 834 354 A1 | 4/1998 |
| EP | 0 853 984 A1 | 7/1998 |
| EP | 0 856 479 A1 | 8/1998 |
| EP | 1 209 104 A1 | 5/2002 |
| EP | 1 462 393 A1 | 9/2004 |
| JP | 2004-277074 A | 10/2004 |
| JP | 2009-227443 A | 10/2009 |
| WO | 2013/150080 A1 | 10/2013 |
| WO | 2015/032402 A1 | 3/2015 |
| WO | 2017/108885 A2 | 6/2017 |

OTHER PUBLICATIONS

International Search Report of PCT/EP2016/082068, dated Jul. 17, 2017.
Fuss et al. "Determination of the performance availability of a modular sorter", 2016 Logistics Journal: Proceedings—ISSN 2192-9084, pp. 1-9.
Gurski et al, "On the complexity of the FIFO stack-up problem," Math Meth Oper Res (2016) 83:33-52.
Dematic Sequencing Simulation (https://www.youtube.com/watch?v=X4BrJrO8db4&feature=youtu.be&t=26) Nov. 4, 2011.
Gurski et al, "Complexity of the FIFO Stack-Up Problem", Computer Science, revised Oct. 15, 2015 (version 6) 1 page (https://arxiv.org/abs/1307.1915v6).
Yong-Hee Han, A Thesis Presented to the Academic Faculty, Dynamic Sequencing of Jobs on Conveyor Systems for Minimizing Changeover, (http://citeseerx.ist.psu.edu/viewdoc/download?doi=10.1.1.91.2813&rep=rep1&type=pdf) Nov. 18, 2004.
Letter from the European Patent Attorney to the European Patent Office in PCT/EP2016/082068, dated Sep. 7, 2017, with English translation of relevant parts.

* cited by examiner

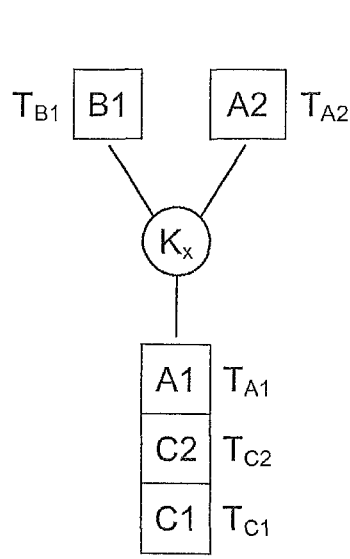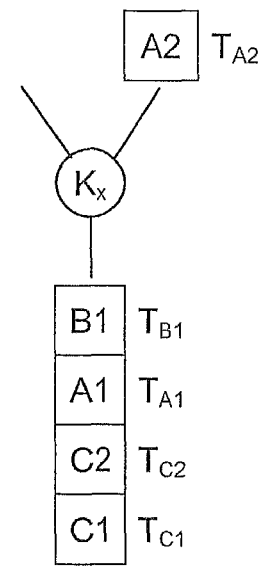
Fig. 18　　　　　　　　Fig. 19
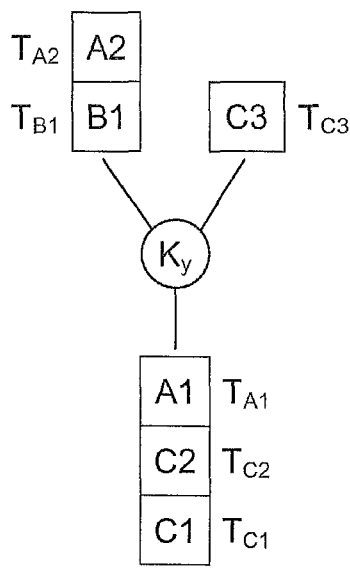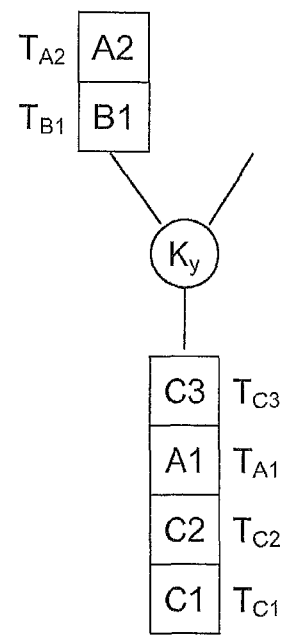
Fig. 20　　　　　　　　Fig. 21

METHOD FOR SORTING CONVEYED OBJECTS ON A CONVEYOR SYSTEM USING TIME CONTROL

CROSS REFERENCE TO RELATED APPLICATIONS

This application is the National Stage of PCT/EP2016/082091 filed on Dec. 21, 2016, which claims priority under 35 U.S.C. § 119 of Austrian Application No. A 51087/2015 filed on Dec. 21, 2015, the disclosure of which is incorporated by reference. The international application under PCT article 21(2) was not published in English.

BACKGROUND OF THE INVENTION

1. Field of the Invention

The invention relates to a method for bundling conveying streams at a material handling element/node with a plurality of incoming conveyor segments, at least one coupling to an outgoing conveyor segment to which the incoming conveyor segments are converged together, and a plurality of holding devices for stopping conveyed objects or a flow on the incoming conveyor segments. Furthermore, the invention relates to a material handling element/node for bundling conveying streams with a plurality of incoming conveyor segments, at least one coupling for an outgoing conveyor segment to which the incoming conveyor segments are converged together, and a plurality of holding devices for stopping conveyed objects or a flow on the incoming conveyor segment. Lastly, the invention also relates to a conveyor system comprising a plurality of such material handling elements/nodes, wherein at least one coupling for an outgoing conveyor segment of one material handling element/node is connected directly or indirectly to an incoming conveyor segment of another material handling element/node.

2. Description of the Related Art

A method, a material handling element and a conveyor system of the said kind are known in principle. Here a plurality of incoming conveying streams on a material handling element are stopped if necessary and conveyed on one or more outgoing conveyor flows in order to direct conveyed objects specifically to one or more destinations. In general, a superordinate controller manages a series of picking orders and controls the elements of the conveyor system so that the conveyed objects assigned to a destination (e.g. a picking station) are taken from a storage and transported to the said destination, in particular in a predefined order or sequence. For this purpose sensors are arranged along the conveying path, which sensors register the passing conveyed objects and inform the superordinate controller, so that the latter has information about where a particular conveyed object is located at any moment and how the conveyor system should be controlled on this basis. In particular if there are many destinations to be supplied and a large number of different objects to be transported the task of controlling this by means of control technology is very complex which makes the operation and particularly the start-up of a conveyor system more difficult.

In a simple embodiment of such a controller a conveyed object that passes such a sensor can trigger the release of the incoming conveying stream at a material handling element. This simplified method only allows a moderate throughput through the conveyor system and therefore only a small number of executed orders per unit of time.

SUMMARY OF THE INVENTION

An objective of the invention is therefore to provide an improved method and a material handling element for bundling conveying streams. In particular, by means of the latter the complexity of a controller for a conveyor system is reduced and the throughput through the latter is increased.

The objective of the invention is achieved by a method of the aforementioned kind, in which for the conveyed objects target arrival times are calculated at which the conveyed objects are scheduled to arrive at a destination, for a conveyed object waiting at a material handling element/node a target run-through time is calculated that the conveyed object needs for transporting as scheduled from a current position to the target destination, and the conveyed object is released at a release time point, which corresponds essentially to the target arrival time point minus the target run-through time.

The objective of the invention is also achieved with a material handling element/node of the aforementioned kind, additionally comprising a controller, which is configured to release a conveyed object at a release time point which corresponds essentially to a target arrive time point, at which the conveyed objects are scheduled to arrive at a target destination, minus a target run-through time, which the conveyed object needs for transporting as scheduled from a current position to a target destination.

Lastly, the objective of the invention is also achieved by a conveyor system with a plurality of material handling elements/nodes of the aforementioned kind, wherein at least one coupling for an outgoing conveyor segment of one material handling element/node is connected directly or indirectly to an incoming conveyor segment of another material handling element/node.

By means of the proposed measures a simple rule for directing and sorting conveyed objects is provided which also enables a high throughput. Specifically for the conveyed objects in a first step target arrival time points are calculated at which the conveyed objects are scheduled to arrive at a target destination. In particular, the target arrival time points are calculated according to a sorting sequence. By means of consecutive target arrival time points a series of conveyed objects is produced. Then for a conveyed object waiting at a material handling element/node—as already described above—a target run-through time and a release time point are calculated. This produces essentially a time control for the individual material handling elements/nodes.

The controller for the material handling element/node is generally set up to release a conveyed object at the calculated release time point. Furthermore, the controller can also be set up to calculate the release time points with reference to the target arrival time points and the target run-through times. Alternatively, this calculation or the calculation of the target release time points can also be performed by a superordinate controller. Also the calculation of the target arrival time points for the conveyed objects, at which the latter are to arrive as scheduled at a target destination, is advantageously performed by a central or superordinate controller. For example, a suitable conveying sequence can be determined by simulation. For this purpose an image of the real conveying system is loaded into a computer which reconstructs a conveying sequence in a simulation. The simulation can be used to check a predefined conveying sequence to see whether a predefined sorting sequence is being followed. If this is not the case the conveying sequence can be improved successively by mutation until the sorting sequence is followed. The said simulated conveying sequence is then applied to the real conveying system.

By means of the proposed measures it is not necessary to execute complicated calculations for sorting conveyed objects for the control of the material handling element/node. Instead the said controller operates on a timed basis and can therefore be structured easily and can also operate rapidly.

The term "essentially" in this context means in particular a deviation of +/−10% from a calculated target time point. If it was calculated for example that a specific conveyed object is to be released at time point 5:24 minutes, corresponding to 324 seconds, then the term "essentially" means in particular a release within a time window of 292 seconds to 356 seconds.

The term "material handling element" is defined in the invention to means any device for conveying and/or manipulating conveyed objects, which merges conveying streams and continues via an outgoing conveyor segment or a plurality of such segments. In particular, the said material handling element can also be referred to as a node, over which conveying streams are guided. Specific examples of such material handling elements include all kinds of channelers, confluences of secondary conveyers into a main conveyor, turntables, but also robots for removing conveyed objects from storage such as for example storage and retrieval machines and autonomous conveying vehicles ("shuttles") and vertical conveyors such as lifts and paternosters. All of these elements can concentrate conveying streams from a plurality of incoming conveyor segments to a node. In the case of lifts and paternosters conveying streams from several levels are concentrated into a few conveying streams (generally on lower levels). A storage and retrieval machine can be defined as a material handling element which concentrates conveying streams from a plurality of storage spaces (generally) to an output conveying flow. Throughout the description of the invention the terms "material handling element" and "node" can be used synonymously.

The "conveyor segments" can generally also be seen as logical conveyor segments and should not necessarily be considered to be purely physical. For example, a storage and retrieval machine can be a v-to-w-multiplexer, wherein v indicates the number of storage spaces reached by the storage and retrieval machine and w indicates the number of objects transported simultaneously by the storage and retrieval machine. Although physically only a single storage and retrieval machine is provided the latter can still be considered as a logical node, which comprises v incoming conveyor segments and w outgoing conveyor segments. It is also possible that only one single conveyor segment leads away from one node. Said node then corresponds to a v-to-1-multiplexer.

The term "holding device" is used in the description of the invention to define all elements for halting a conveying stream. For example the latter include barriers which can be inserted or positioned in the conveying stream. A holding device can also consist of a conveyor belts, conveyor chains, conveyor rollers and the like, which can be stopped (i.e. are not just loosely mounted). Said conveying means are generally used for both conveying and also stopping conveyed objects.

It is thus conceivable according to the invention that a holding device is assigned to each of the incoming conveyor segments and also that only a portion of the incoming conveyor segments of a material handling element is assigned a respective holding device. In particular, it is possible that a holding device is assigned to each incoming conveyor segment apart from one.

For example a "conveyor system" can also comprise, in addition to the already mentioned material handling elements/nodes of the aforementioned kind, a store, storage and retrieval machines, lifts, paternosters, conveyor belts, roller conveyors, order picking stations and the like.

For determining the actual position of a conveyed object on a conveyor system sensors and reading devices can be used for example, which make it possible to identify a conveyed object. For example, the latter include barcode readers, RFID readers (Radio Frequency Identification) and video cameras. Other sensors for measuring a physical property of a conveyed object, such as for example the length, weight, color and the like, can be used in principle as a triggering device, in particular if a plurality of physical properties are measured which are suitable for identifying a conveyed object. For example this can be a combination of a specific value range of an object length, a specific value range of an object weight and a specific value range of an object color.

The term "downstream" is used in the invention to refer generally to places which follow a reference point in conveying direction of the conveyed objects. A conveyed object thus reaches the said reference point first in terms of time and then downstream places or positions.

The term "upstream" is the opposite of "downstream". A conveyed object thus reaches upstream places or positions first in terms of time and then the said reference point.

The "conveying direction" refers to the direction in which the conveyed objects move on the conveyor system (in normal operation).

A moved conveyed object (and in particular a plurality of moved conveyed objects) forms/form a "conveying flow" or "conveying stream".

The setting of target arrival time points by the superordinate controllers is performed preferably shortly before processing an order or sequence. For example, the planning can be about 3-5 minutes in the future. The aim here is to supply an order picking workstation with conveyed objects as constinuously as possible, so that an order picker does not need to wait for a conveyed object to be picked and the conveyed objects do not build up too much at the order picking station.

Generally two variants are possible for the sequence planning. On the one hand the order in which the conveyed objects arrive at the order picking station can be irrelevant, or the conveying system needs to maintain or ensure a specific sequence of conveyed objects at the order picking station. In the first variant for all conveyed objects in a group, in which the sequence of the conveyed objects is irrelevant, the same target arrival time point is defined for all of said conveyed objects. However, the target arrival time points of the conveyed objects differ from one another in the second variant. Advantageously, the difference between the target arrival time points of two consecutive conveyed objects corresponds to the processing time (picking time) of the lower ranked, i.e. earlier conveyed object. This means that the target arrival time point of a conveyed object n+1 corresponds to the target arrival time point of the preceding conveyed object n plus the processing time (picking time) required for the conveyed object n. The processing time for a type of conveyed object, for example the time which is necessary for removing a tin can from a proffered loading aid and the deposit of the tin can into a packaging container can be determined empirically for example or based on experience. In particular, actually performed processes can be recorded and evaluated statistically. The target arrival time points are of course also influenced by when an order is expected to be finally picked. For example, it is possible to take into consideration when a lorry is expected or is planned to take over picked packaging containers onto a loading ramp. The last target arrival time point of a conveyed object at an order picking station is thus at least so far ahead of the time point of loading the packaging container into the lorry that the latter can be transported from the picking station to the loading ramp and prepared for transport. In this way it is possible for the superordinate computer to determine target arrival time points for the conveyed objects. The aforementioned criteria are of course given purely by way of example and are simply used to illustrate the proposed method. Of course, in addition or alternatively other criteria can also be used for the planning.

The same as for the target arrival time points applies to the run-through times of a conveyed object through the conveying system, for example from a specific storage space to a specific destination. Said run-through times are dependent on the structure of the conveying system and also on the "volume of traffic" on the latter and can be determined at the planning stage by simulation. It would also be possible to undertake empirical trials in a test run. Lastly, also real actual run-through times can be recorded and used for adjusting the respective target run-through times to reality. For example here statistical evaluations and adaptive algorithms of a known kind can be used. For example, the arrival times of a conveyed object at various locations in the conveying system can be determined or documented and then evaluated. In principle, however the evaluation of the actual run-through time from the starting point (e.g. from the storage) to the target time point (e.g. to the order picking station) is sufficient.

Advantageously, the path through the conveying system is defined by the superordinate computer, wherein feedback to the conveying system about disrupted conveyor segments can be taken into account. For example conveyor segments which have failed and over which no conveyed objects can be conveyed are left out of the planning. A target of the planning can be the greatest possible throughput or the lowest possible run-through time through the conveying system. The volume of traffic at the individual nodes can be taken into consideration for planning the path through the conveying system, preferably during the planning however only the destination is considered and the current volume of traffic at the individual nodes remains irrelevant. This means that for the superordinate computer in an advantageous variant of the proposed method during the planning the focus is simply and only the optimal supply to the order picking stations. The implementation of the plan is then incumbent on the material handling elements/nodes in the conveying system, the conveyed objects being directed autonomously through the conveying system.

When planning the conveying stream in the conveying system unexpected events can be taken into account in that conveyed objects may arrive later at the order picking workstation, but not earlier, in order to avoid the unwanted build up of currently not required conveyed objects at the order picking workstation. For example this can be performed in that the superordinate computer uses the shortest run-through time known from simulations, trials and/or experience from the respective starting point to the respective target point for the planning, from which and to which the conveyed object needs to be transported. A situation where the conveyed object takes less time than the previously known minimum run-through time is unlikely, so that the real current arrival time points are pushed further back automatically. If the conveyed object is still unexpectedly faster the new run-through time for the following planning can replace the previous minimum run-through time. The synchronisation of a delayed conveyed object with an assigned packaging container can be performed automatically by the conveying system, for example in that the conveying system automatically serves the packaging container suitable for a conveyed object at the order picking station.

Generally the precision of the planning means there is less need for corrections or adjustments. In one variant of the proposed method however errors in a sorting sequence are allowed in favour of simplified planning and/or in favour of increased throughput. Said sorting errors are then corrected at the order picking station. For example, it is then the case that the conveying system automatically provides the specific packing container which fits a conveyed object at the order picking station.

In one variant of the proposed method a plurality of orders are processed simultaneously at an order picking station. Therefore, it is possible that the conveyed objects of an order arrive necessarily in a predefined sequence at the order picking station, but the sequence of orders within a group of orders remains unimportant. This means that it is irrelevant whether conveyed objects of a second order follow conveyed objects of a first order, or whether conveyed objects of the second order arrive before conveyed objects of the first order at the order picking station. In this way the flexibility of the sequence planning by the superordinate controller is much greater than in methods in which the orders have to arrive in sorted form at an order picking station. Furthermore, it is also possible to allow sorting errors within an order to increase the flexibility of the planning further. In one embodiment variant of the proposed method the superordinate computer also does not distinguish between several destinations, even if the latter actually exist. For the planning in this case it is mainly important when the conveyed objects are to arrive at the picking area, which can comprise a plurality of picking stations. The division of the conveyed objects to the individual order picking stations is then taken over by the material handling elements/nodes of the conveying system.

It is also possible that the actual run-through times of the conveyed objects through the conveying system are monitored and an alarm is given off and/or corrective measures are taken, when the actual run-through time exceeds a predefinable threshold, in particular a path-specific threshold, which is assigned to the path over which the respective conveyed object has been conveyed through the conveying system. Of course it is also possible to use a start-destination specific threshold, which is assigned to the starting point and the target point of the conveyed object or thresholds which are based on other criteria. A measure for reducing the run-through times can be to put the target arrival time points further in the future than would be necessary for supplying the order picking workstation with conveyed objects. This means that the frequency of the conveyed objects arriving at the order picking station decreases and thus also the frequency and number of conveyed objects conveyed via the conveying system increases. In this way also the loading of the conveying system is reduced and the actual run-through times are shortened.

The controllers or control algorithms which are used for controlling the supply of order picking stations and also for avoiding the overloading of the conveying system can generally be a component of the superordinate computer or can be depicted there in software. For example a proportional controller can be provided, the control size of which is the number of conveyed objects waiting at an order picking workstation or the frequency of the conveyed objects arriving at an order picking workstation and its regulating variable is the target arrival time of a conveyed object at said order picking workstation. In particular, also a plurality of nested controllers can be involved in the control of the conveying stream through the conveying system. In particular, the regulating variable of a plurality of or all controllers is the number of conveyed objects waiting at an order picking workstation or the frequency of the conveyed objects arriving at an order picking workstation.

Advantageous embodiments and developments of the invention are given below.

It is particularly advantageous if a first conveyed object waiting at a material handling element/node is released after a second conveyed object with a target arrival time point further in the future, if the target run-through time for the second conveyed object is longer than for the first conveyed object. In this way the conveying section following the material handling element/node is only occupied for a relatively short period by the two conveyed objects, in any case for a shorter time than with the release of the first conveyed object before the second conveyed object.

It is also particularly advantageous if a first conveyed object waiting at a material handling element/node is released before a second conveyed object with a target arrival time point further in the future, if the target run-through time for the second conveyed object is longer than for the first conveyed object and the first conveyed object thereby arrives at the destination before a third conveyed object, the target arrival time point of which is after the target arrival time point of the second conveyed object. By selecting consecutive target time points then generally a sequence of conveyed objects can be formed. In reality however this is not always achievable, for example if there are disruptions on the conveying system which delay the first and second conveyed object unintentionally. By means of the proposed measures the number of sorting errors in such a case are kept small. In any case there are here fewer sorting errors than with the release of the first conveyed object after the second conveyed object.

In a particularly advantageous embodiment of the proposed method before removing conveyed objects from storage a plurality of variants of target arrival time points containing a predefined sorting sequence are calculated for a plurality of conveyed objects and in particular a plurality of destinations, and the variant is actually performed which results in the lowest occupancy time of the conveying system. In this way the throughput on the conveying system is optimised, and the conveying system can be used optimally. For example a start variant which meets a predefined sorting sequence of several conveyed objects is selected randomly. Then by changing the conveying sequence further variants are selected which ensure the said sorting sequence. If one of said following variants is better than the start variant, i.e. it results in the same sorting sequence in a short period, then the latter following variant is used as a reference. By means of recursive mutations of the conveying sequence it is possible to determine successively improved, i.e. faster variants. The simulation can be interrupted for example after a predetermined time or also for example if after a predefined time there is no more improvement and it is assumed that at least one local optimum has been found.

The term "occupancy time of the conveying system" is used within the scope of the invention to means the time taken from removing a first conveyed object of an order or several orders from storage to the arrival of the last conveyed object of said order or orders at its destination. In general an order can comprise a conveyed object or several conveyed objects and be assigned to a destination or a plurality of destinations.

It is also particularly advantageous if a conveyed object is conveyed into a buffer, a sequencer, an alternative route or a feedback route and is held there until this position has been passed by a conveyed object preceding the relevant conveyed object in the sorting sequence, if this results in a reduction of the occupancy time of the conveying system and/or in unbalanced loads on the conveying system. In this variant of the proposed method thus errors in a sorting sequence can be deliberately allowed and then corrected at a later time point, in order to thus use the conveying system in an optimal manner. In this way it is possible to have a mix-up in the formed actual sequence and thus also a deviation from the target sequence, and thus also the number of blockages in the conveying system decreases and the throughput increases. If necessary the conveyed objects before reaching the target also run through a sorting stage in order obtain an accurate actual sequence. By means of presorting the said sorting stage can be kept small and therefore only takes up a small amount of space.

Unbalanced loads are generally characterised in that parts of the conveying system are overloaded very heavily or excessively. Even if other parts are only loaded a small amount and said minimally loaded parts form the majority, the total throughput through the conveying system can decline significantly due to an unbalanced load. Therefore, generally it is desirable to aim to have an even load on the conveying system or even loading of the conveying system. The aforementioned method can be used to achieve a high degree of even loading.

However, it is also possible that a second conveyed object, which follows a first conveyed object in a target sorting sequence, is conveyed into a buffer, a sequencer, an alternative route or a feedback route and is stopped there until this position has been passed by the first conveyed object, if the first conveyed object has been delayed on the conveying system in an unscheduled or unplanned manner and a target arrival time point is no longer possible before the target arrival time point of the second conveyed object without using the buffer, the sequencer, the alternative route or the feedback route. By means of the proposed measures sorting errors can be corrected which are unplanned. For example such unplanned sorting errors can be caused by disruption on the conveying system.

It should be noted at this point that the explained release of conveyed objects, which results in a temporary error in the sorting sequence or the removal of planned and also unplanned sorting errors can also be applied without the disclosed time control. Furthermore, also another sorting algorithm can be superordinate to the release of conveyed objects or to the removal of sorting errors leasing to a temporary error in the sorting sequence.

The term "buffer" is defined in the invention as an element of conveying technology for the temporary holding of a conveyed object or a plurality of conveyed objects. The ejection from the buffer is not necessarily optional depending on the design and configuration.

A "sequencer" is a special type of a buffer with optional access. This means that each conveyed object stored temporarily in the sequencer can be transferred independently of other temporarily stored conveyed objects into a conveying stream.

An "alternative route" can be defined as a partially parallel guided conveying stream.

In a "feedback route" inputs and outputs of at least two material handling elements/nodes are mutally connected to one another directly or indirectly. "Directly" means in this context that the coupling for an outgoing conveyor segment of one material handling element is connected without the interconnection of other elements to an incoming conveyor segment of another material handling element, "indirectly" means the opposite.

A common element of the buffer, sequencer, alternative route and feedback route is a divergence or division of the conveying stream. A corresponding material handling element/corresponding node therefore comprises a plurality of outgoing conveyor segments. A further reason for the diversification/division of the conveying stream can be that an outgoing conveying stream is directed into different areas of a conveyor system or to different destinations (in particular order picking workstations or packing stations).

It is also particularly advantageous if the target arrival time points are recalculated for the conveyed objects which have not yet arrived at their destination taking into consideration the said unscheduled/unplanned delay. In this way the further planning of the conveying sequence is based on reliable facts, whereby the probability of an ongoing accurate sequence is increased.

It is particularly advantageous in this connection if several variants of target arrival time points observing a predefined sorting sequence for a plurality of conveyed objects, which have not yet reached their destination, are calculated taking into account the said unscheduled/unplanned delay and the variant is actually executed which has the least occupancy time of the conveying system. In this way the further conveying sequence can be optimized.

It is advantageous if the material handling elements/nodes have access to a common table of target arrival time points. If necessary, the common table can also contain the target arrival time points and the target run-through times or also the target release time points. In this way the material handling elements/nodes have up-to-date information about the position and sequence of the conveyed objects. If the controllers of the material handling elements/nodes are formed by a plurality of entities of a software algorithm in a computer, then the joint table of target arrival time points/target run-through times/target release time points can be saved in particular on said computer.

In a further advantageous variant of the method a plurality of conveyed objects arrive as scheduled at a destination at the same target arrival time, or a plurality of conveyed objects have the same serial number in a sorting sequence. In this way it is possible to form a plurality of groups of conveyed objects arranged in a sorting sequence, in which the conveyed objects can be arranged unordered. This means that the conveyed objects do not necessarily have a clear serial number. For example, the sorting sequence can comprise a plurality of conveyed objects with the serial number 3. Said conveyed objects are arranged by means of the proposed method after group 2 but before group 4. In group 3 however the arrangement of the conveyed objects is random. This is advantageous if a plurality of similar objects (e.g. water bottles) need to be grouped in a conveying stream in a specific position but the position of a specific object within this group is irrelevant.

It is particularly advantageous if at least those methods steps, which are related to a decision about the release of a conveyed object, apart from the consideration of a target arrival time point/a target run-through time/a target release time point are executed independently of all other material handling elements/nodes and/or independently of a central controller. In this way the communication and thus the use of communication lines between material handling elements can be minimized.

It is also particularly advantageous if a program logic relating to the release of a conveyed object in all material handling elements/nodes is identical, or if the methods steps are performed in an identical manner with respect to the release of a conveyed object in all material handling elements/nodes. In this way, the effort of producing or programming the controller for a conveyor system can be minimized overall, as the latter is made up of a plurality of identical modules. It is thus also possible to minimize the cost of any possible errors.

Furthermore, a method for operating a conveyor system of the said kind with an upstream warehouse with storage spaces for conveyed objects is advantageous in which the material handling element is designed as a robot for removing goods from storage. As already mentioned such robots, which are designed for example as storage and retrieval machines, autonomous conveying vehicles ("shuttles"), lifts or paternosters, can concentrate conveying streams of several incoming conveyor segments to one node. For example, a storage and retrieval machine can be considered as a v-to-w-multiplexer, wherein v is the number of storage spaces reached by the storage and retrieval machine and w is the number of objects transported simultaneously by the storage and retrieval machine.

A method for operating a conveyor system of the said kind with an upstream store with storage spaces for conveyed objects is advantageous, in which conveyed objects are removed from storage in order with respect to the destinations and with regard to a sorting sequence for a destination to be supplied. This means that firstly conveyed objects for the destination are removed from storage with the lowest position in a sequence, then the conveyed objects with the second lowest position etc. In addition, the conveyed objects for a specific destination are also removed from storage in an ordered manner. If the storage, from which goods are removed by means of a material handling element, contains for example the conveyed objects 3 and 5 of the destination A and the conveyed objects 1 and 7 of the destination B, then the conveyed objects are removed from storage in the sequence A3, A5, B1, B7. In this example it is assumed that the missing conveyed objects in the sequence (e.g. A1, A2, A4, B2, B3, etc.) are located in other warehouses which are removed from storage by other material handling elements. In this way there can be overall a higher degree of ordering of the conveying streams on the conveying technology.

However, it is also advantageous if conveyed objects are ordered with regard to a sorting sequence for a destination to be supplied, but with regard to the destinations are removed from the warehouse chaotically or not necessarily in any order. With regard to the previously mentioned example this means for example that the conveyed objects can also be removed from storage in the sequence B1, A3, A5, B7 or for example also in the sequence B1, A3, B7, A5. By means of the unordered removal from storage at the destination level the throughput can be increased during the removal from storage, for example if transport paths are minimized during the removal from storage.

It is also advantageous if at least two material handling elements are connected to one another directly or indirectly in the form of a ring, or if at least one part conveying flow is guided annularly over the said material handling elements. In other words, in the network of connected material handling elements a feedback route is provided. For this purpose at least one outgoing conveyor segment of at least one material handling element is connected to at least one incoming conveyor segment of at least one other, upstream material handling element. In this way the ordering level of the transported conveyed objects can be increased in several run-throughs, or gaps in the sequence can be filled in step-by-step.

It should be noted at this point that the terms "downstream" and "upstream" can be used synonymously in relation to an annular partial flow.

In a further advantageous variant of the method the releases per unit of time are monitored by a superordinate controller, and the holding device is released at which the conveyed object with the lowest serial number is waiting, if for the releases per unit of time a threshold is not met. This prevents a disadvantageous arrangement of the conveyed objects on the conveyor system causing longer blockages. Instead of releasing the conveyed object with the lowest serial number, the release can also be performed chaotically or randomly for example. Advantageously this variant of the method is combined with a buffer, sequencer, alternative route or feedback route or diversification downstream of the node in the conveying stream, in order to produce the desired degree of ordering of the conveyed objects transported on the conveyor system. It is also advantageous if the threshold is adapted to the number of objects located on the conveyor system. This means that the threshold is increased if the number of transported objects increases and vice versa. This prevents a decreasing number of releases, caused by a small number of transported conveyed objects being misinterpreted as a blockage. For example, such a situation may occur when starting an order picking job or for example when this is almost complete. In both cases there are comparatively few objects on the conveyor system because they are mostly still in storage or have already been loaded into shipping containers. It is also advantageous if an interruption of the removal of conveyed objects at a destination is taken into account. Particularly with manual order picking there are interruptions in the work sequence, for example if a worker is taking a break or has gone to the bathroom. In this case there may also be a decrease in the number of releases per unit of time which is not the result of a blockage.

In a further advantageous variant of the method the releases per unit of time to the destination to be supplied are monitored by a superordinate controller and the particular holding device is released at which the conveyed object with the target arrival time point of the relevant destination is waiting when a threshold is not met for the releases per unit of time assigned to the relevant destination. The above explanation of the previously disclosed variant applies by analogy to this variant. However here the releases are not taken into account globally, but separately per destination.

It should be noted at this point that the disclosed variants of the method according to the invention and the advantages resulting therefrom relate to the material handling element and/or the conveyor system according to the invention and vice versa.

BRIEF DESCRIPTION OF THE DRAWINGS

For a better understanding of the invention the latter is explained in more detail with reference to the following figures.

In a much simplified, schematic representation:

FIG. 18 shows the physical arrangement of several conveyed objects at a first node at a first time point and their assigned target arrival time points;

FIG. 19 as FIG. 18, but after conveying a conveyed object;

FIG. 20 shows the physical arrangement of several conveyed objects at a second node at a second time point, and their assigned target arrival time points;

FIG. 21 as FIG. 20, but after conveying a conveyed object;

DETAILED DESCRIPTION OF THE PREFERRED EMBODIMENTS

Figure 1:
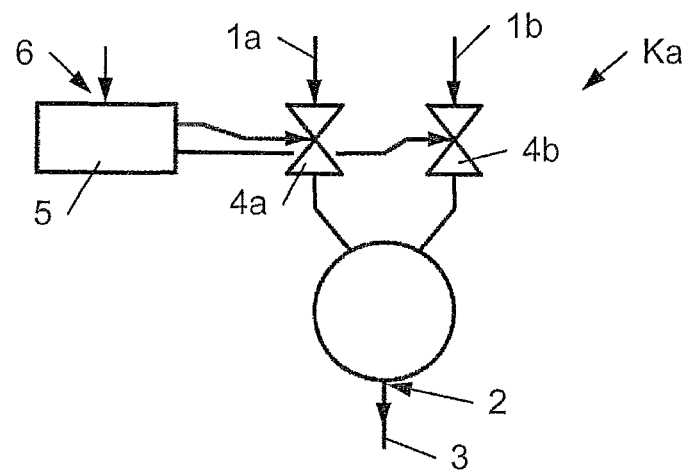
FIG. 1 shows a first schematically represented example of a material handling element/node.

First of all, it should be noted that in the variously described exemplary embodiments the same parts have been given the same reference numerals and the same component names, whereby the disclosures contained throughout the entire description can be applied to the same parts with the same reference numerals and same component names. Also details relating to position used in the description, such as e.g. top, bottom, side etc. relate to the currently described and represented figure and in case of a change in position should be adjusted to the new position. Furthermore, also individual features or combinations of features from the various exemplary embodiments shown and described can represent in themselves independent or inventive solutions.

FIG. 1 shows a first example of a material handling element Ka for bundling conveying streams. The material handling element Ka comprises two incoming conveyor segments 1a, 1b, a coupling 2 for an outgoing conveyor segment 3, to which the incoming conveyor segments 1a, 1b are merged and a plurality of holding devices 4a, 4b for halting a flow on the incoming conveyor segments 1a, 1b. Due to the said merging the material handling element Ka can also be interpreted as a node. In addition, the material handling element Ka comprises a controller 5, which is connected on the output side to the said holding devices 4a, 4b. At one input 6 the controller 5 is optionally connected to a superordinate central controller, as shown in FIG. 1 by an input-side arrow.

In the example shown in FIG. 1 only two incoming conveyor segments 1a, 1b are provided. Of course it is also possible that more than two incoming conveyor segments 1a, 1b are provided. It is also possible that unlike the representation of FIG. 1 more than one coupling 2 and more than one outgoing conveyor segment 3 are provided. It is also possible that the controller comprises additional inputs for processing signals of further controllers, in particular of further controllers 5 of further nodes K.

It should also be mentioned at this point that FIG. 1 is simply a symbolic representation of the material handling element Ka. For example, the holding devices 4a, 4b are shown as valves. Of course, this should not be considered to be restrictive but any elements for halting a conveying stream can be used as holding devices 4a, 4b. For example this can include barriers or gates which can be pushed or inserted into the conveying stream. A holding device 4a, 4b can also consist of conveyor belts, conveyor chains, conveyor rollers and the like, which can be halted. As said conveying means are generally used both for conveying and also for halting conveyed objects 17, in this case it is difficult or impossible to make a clear distinction between the holding devices 4a, 4b and the incoming conveyor segments 1a, 1b. The incoming conveyor segment 1a, 1b therefore has a double function in this case.

It is also possible that—unlike the representation of FIG. 1—a holding device 4a, 4b is not assigned to all incoming conveyor segments 1a, 1b. For example the holding device 4b can be omitted, so that an incoming conveyed object 17 to the conveyor segment 1b is always conveyed or conveyed with priority.

Figure 2:
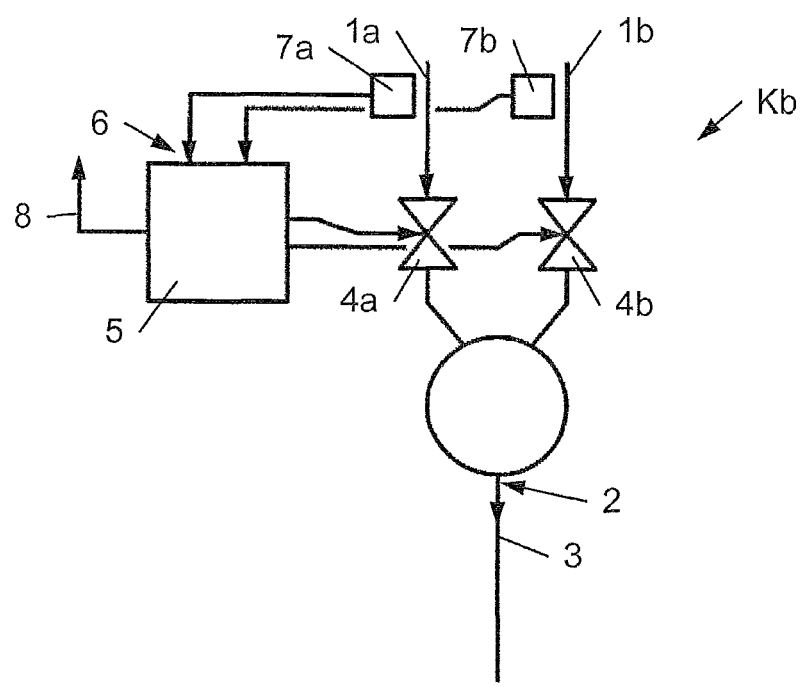
FIG. 2 as FIG. 1, but with sensors/reading devices in the incoming conveyor segments.

FIG. 2 shows a further example of a material handling element Kb, which illustrates in particular that the controller 5 is not restricted to controlling the holding device 4a, 4b, but can also take on other tasks. In FIG. 2 the controller 5 is connected to sensors and/or reading devices 7a, 7b, by means of which the incoming conveyed objects 17 to the conveyor segments 1a, 1b can be identified and their current rank or current position in a sorting sequence can be determined. Furthermore, the starting line 8 indicates that the said detection of an incoming conveyed object 17 can also be communicated to other material handling elements Ka, Kb or also to a superordinate controller.

In general a "material handling element" or "node" can be defined as any device for conveying and/or manipulating conveyed objects 17, which merges conveying streams and transports further via an outgoing conveyor segment or a plurality of such segments. For example this is clear from FIGS. 1 and 2 for channelers, confluences from secondary conveyor belts into a main conveyor belt and turntables. Material handling elements, which merge together conveying streams can also be formed for example by robots for unloading conveyed objects 17 from a storage.

Figure 3:
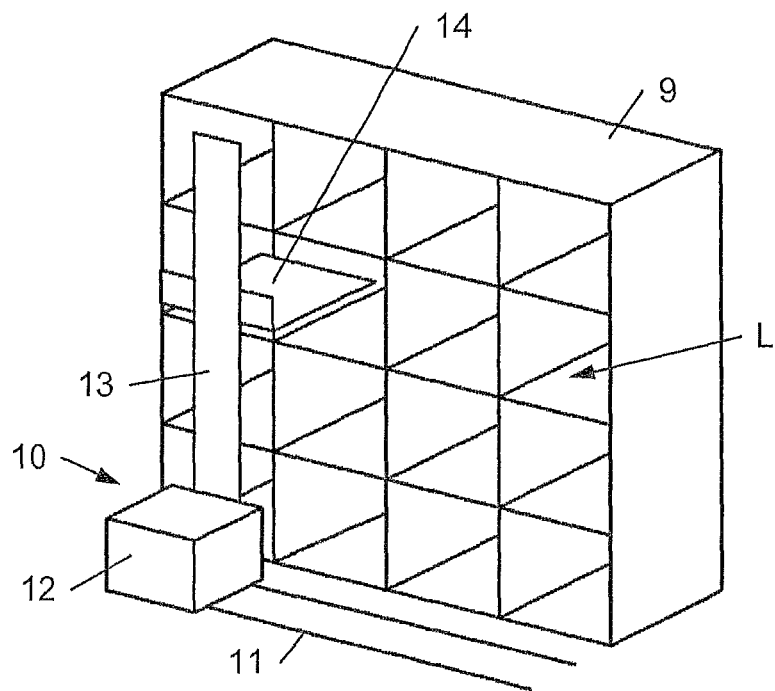
FIG. 3 shows a schematically depicted warehouse and storage and retrieval machine in perspective view.

FIG. 3 shows an example of an arrangement comprising a storage 9 with a plurality of storage spaces L and a storage and retrieval machine 10, which comprises a car 12 running on rails 11 with a lifting platform 14 running vertically on a mast 13. The function of a storage and retrieval machine 10, which here operates as an unloading robot for the storage 9, is known per se and therefore does not need to be explained in detail at this point.

Figure 4:
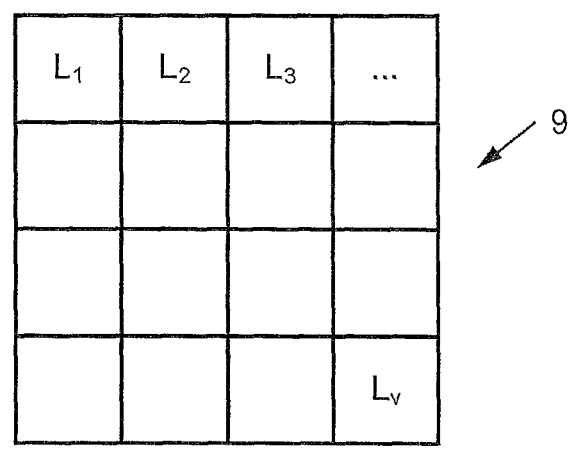
FIG. 4 shows the storage of FIG. 3 in front view.

FIG. 4 shows a schematic front view of the storage 9, showing a possible numbering of the storage spaces L1 . . . Lv.

Figure 5:
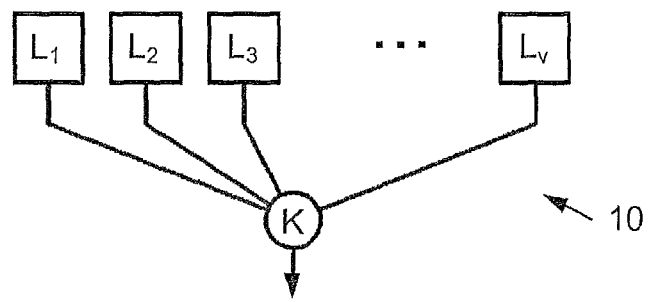
FIG. 5 shows a logical representation of the storage and retrieval machine of FIG. 3.

FIG. 5 now shows a logical or symbolic representation of the storage and retrieval machine 10 shown in FIG. 3. From FIG. 5 it can be seen that a number of incoming conveyor segments 2 corresponding to the number v of storage spaces L1 . . . Lv is concentrated on an outgoing conveyor segment 3. The concentration of the conveying stream is thereby formed by the lifting platform 14, which in this example can hold only one conveyed object 17 respectively. The storage and retrieval machine 10 can thus be regarded as a v-to-1-multiplexer.

Figure 6:
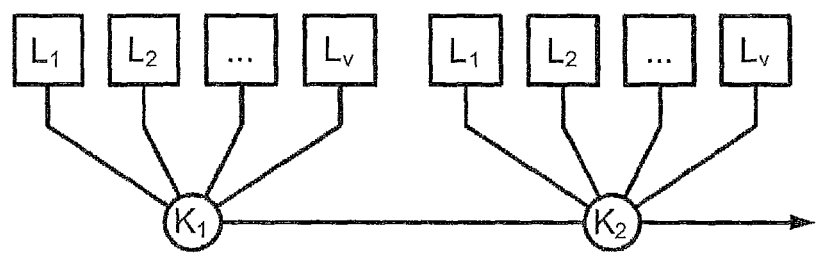
FIG. 6 shows a logical representation of a storage and retrieval machine, which can receive several conveyed objects at the same time.

It is also possible that the lifting platform 14 can hold several conveyed objects 17 at the same time. A logical representation of a storage and retrieval machine 10 with a lifting platform 14 holding two conveyed objects 17 is shown in FIG. 6. Each of the storage positions thereby forms a logical node K1, K2. In this specific example it is assumed that the conveyed objects 17 are transported away to the right. This means that the object located at the node K1 can be transported away first, when the object transported via the node K2 has left the lifting platform 14. For this reason the output from the node K1 is guided as an input to node K2. Of course, other arrangements are also possible in which the conveyed objects 17 can leave the lifting platform 14 at the same time and the nodes K1, K2 are thus not linked in the shown manner. In general, a storage and retrieval machine can be regarded as a v-to-w multiplexer, wherein v is the number of storage spaces L1 . . . Lv reached by the storage and retrieval machine 10 and w is the number of objects transported simultaneously from the storage and retrieval machine 10 or storage positions provided on the lifting platform 14. From FIGS. 5 and 6 it is also shown in particular that the conveyor segments can also be seen in general as logical conveyor segments and should not necessarily be regarded purely in physical terms. In the case of a v-to-1 storage and retrieval machine at any one time point "there is" always only one incoming conveyor segment 1a, 1b.

Figure 7:
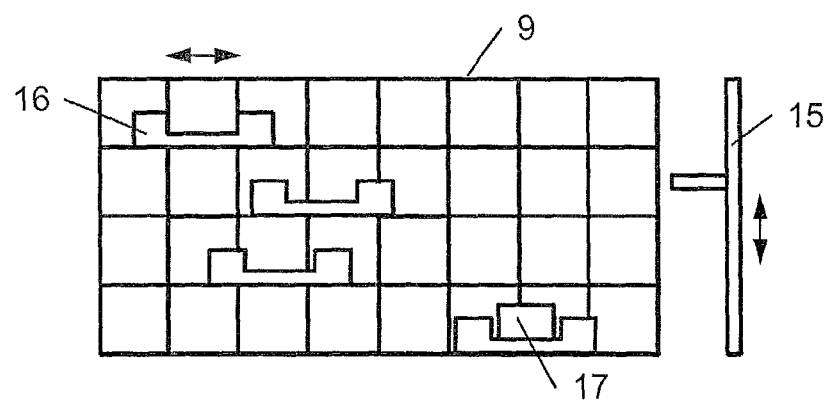
FIG. 7 shows a storage with a lift connected to the latter and with autonomously driving conveyor vehicles.

FIG. 7 shows a further example of an arrangement comprising a storage 9, a lift 15 arranged next to the storage 9 and a plurality of autonomous conveyor vehicles 16 ("shuttles") operating on the individual storage levels. Such a shuttle 16, or such a removal robot removes a conveyed object 17 from a storage space L and transports it to the lift 15. The latter picks up the conveyed object 17 and transports it to a conveyor belt for further transport (not shown).

Figure 8:
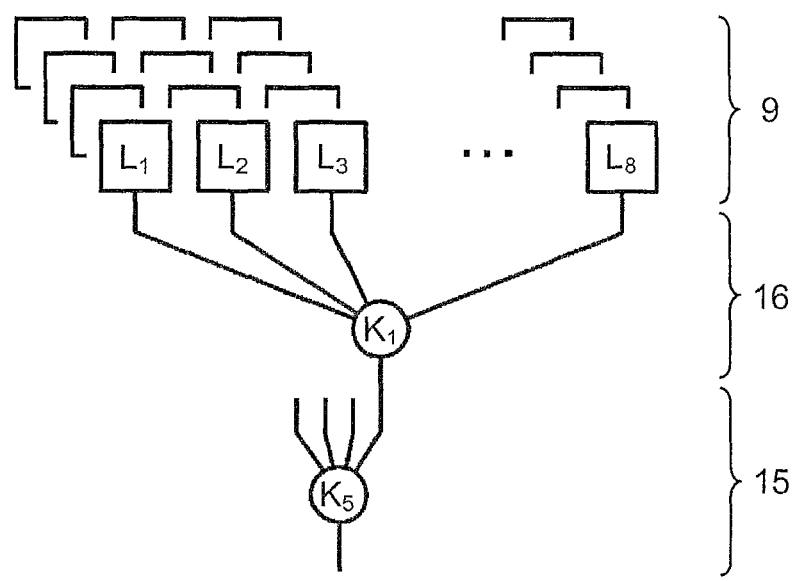
FIG. 8 shows a logical representation of the arrangement of FIG. 7.

The logical structure resulting from FIG. 7 is shown in FIG. 8. Here each shuttle 16 forms a node K1 . . . K4, to which the storage spaces L1 . . . L8 of a storage aisle are guided. The conveyor segments 3 coming from node K1 . . . K4 are guided in turn to the node K5 which represents the lift 15.

Figure 9:
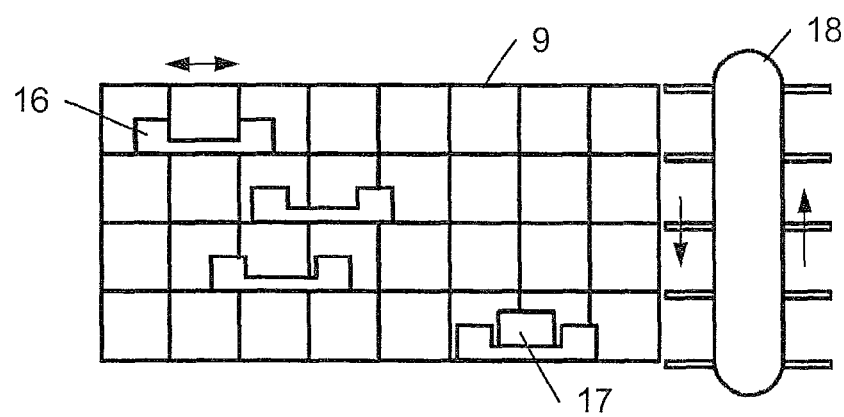
FIG. 9 as shown in FIG. 7, but with a paternoster instead of the lift.

FIG. 9 shows another arrangement comprising a storage 9 and shuttles 16, which is very similar to the arrangement shown in FIG. 7. The difference is that a paternoster 18 is provided instead of the lift 15.

Figure 10:
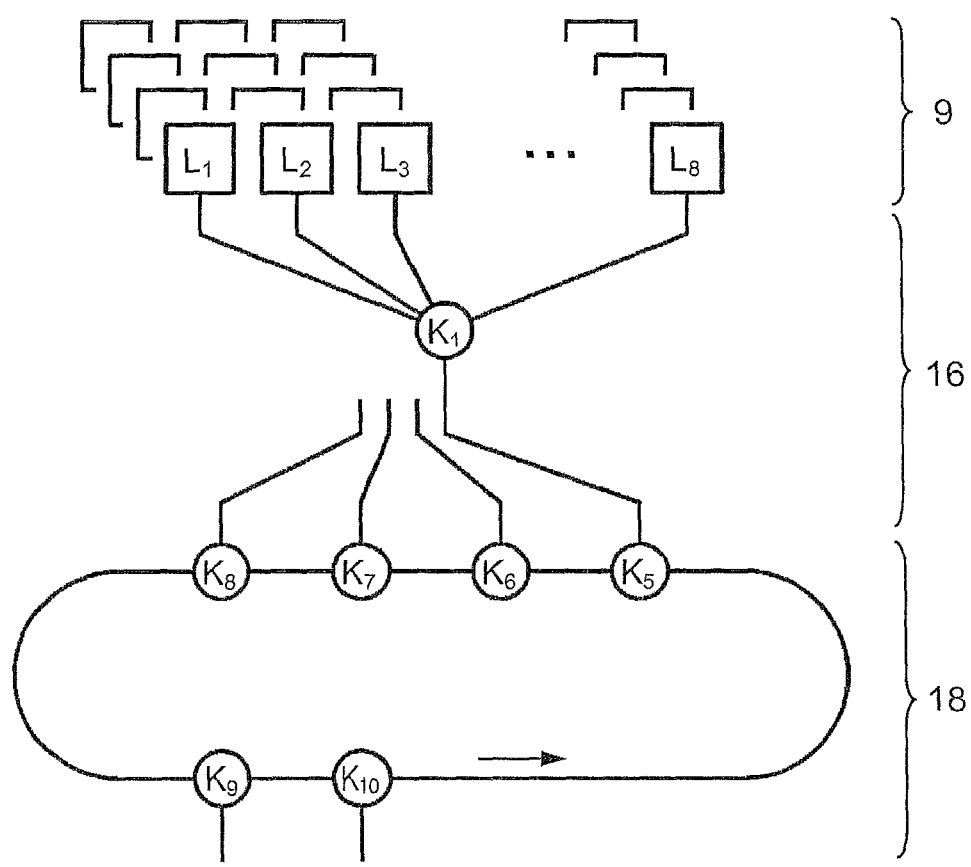
FIG. 10 shows a logical representation of the arrangement of FIG. 9.

FIG. 10 shows a logical representation of the arrangement shown in FIG. 9. Under the condition that the paternoster 18 can transport the conveyed objects 17 in a circle, the latter is shown in FIG. 10 as a loop, wherein the nodes K5 . . . K8 form the transfer points to the individual levels of the storage 9 and the nodes K9 and K10 form two removal tracks, which can be arranged (physically) next to one another for example or can also be arranged above one another.

Figure 11:
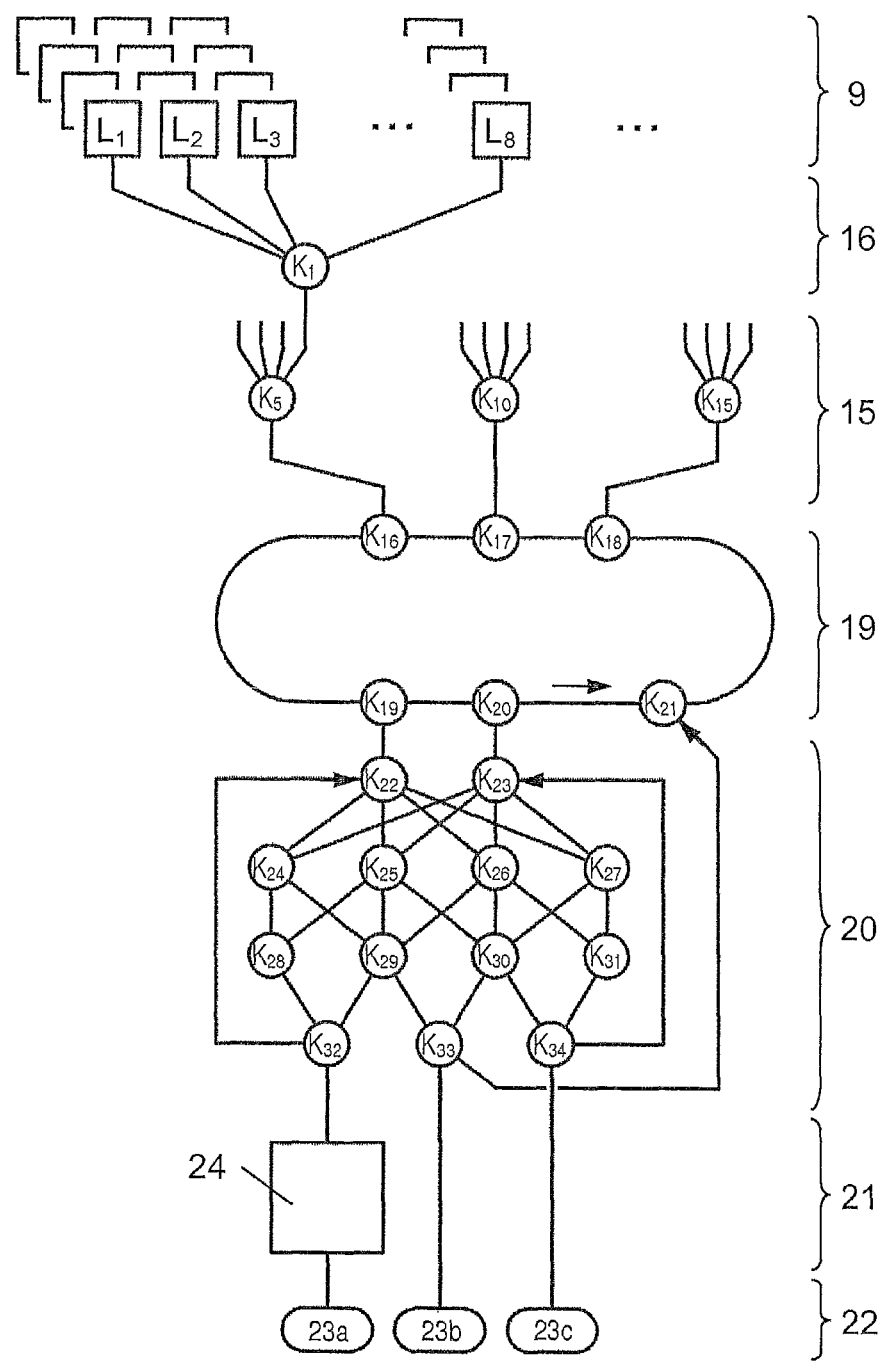
FIG. 11 shows an example of a slightly more complex conveyor system.

FIG. 11 shows in addition a slightly more complex example of a conveying system. As already shown in FIGS. 5, 6, 8 and 10 a plurality of material handling elements Ka, Kb are coupled to one another such that at least one coupling 2 for an outgoing conveyor segment 3 of one material handling element Ka, Kb is connected directly or indirectly to an incoming conveyor segment 1a, 1b of another material handling element Ka, Kb. As already shown in FIGS. 5, 6, 8 and 10 the material handling elements or nodes K1 . . . K34 are only represented in simplified form.

"Directly" in the above context means that the coupling 2 for an outgoing conveyor segment 3 of a material handling element Ka, Kb is connected to an incoming conveyor segment 1a, 1b of another material handling element Ka, Kb without the interconnection of other elements. For example this relates in FIG. 11 to nodes K5 and K16. "Indirectly" means that other elements are connected in between, in particular branch junctions and the like. For example, the connection between nodes K16 and K24 is indirect, as K19 and K22 are connected in between and act as a divergence.

Specifically, the arrangement shown in FIG. 11 comprises a storage 9, a plurality of shuttles 16 operating autonomously therein as well as lifts 15 associated with the storage 9. In this example the storage 9 has three rows of shelving or aisles, wherein each aisle 32 comprises storage spaces L which are arranged in four levels with eight spaces in each. Thus the shuttles 16 represented by nodes K1 . . . K4 move in the first aisle, the shuttles 16 represented by nodes K6 . . . K9 move in the second aisle and the shuttles 16 represented by nodes K11 . . . K14 moves in the third aisle. The lifts 15 are represented by the nodes K5, K10 and K15.

A horizontal loop 19 is connected to the lifts, in which loop the nodes K16 . . . K21 are arranged. The arrow denotes the conveying direction. Via nodes K19 and K20 conveyed objects 17 are transferred from the loop 19 into a network 20 which comprises a plurality of interlinked nodes K22 . . . K34. An optional sorting area 21 is arranged next to the network 20 and a picking area 22 is connected to the latter. In the picking area 22 there are three targets 23a . . . 23c to be supplied, for example workstations, at which conveyed objects 17 are loaded automatically or manually into packaging containers or onto pallets. In the example shown in FIG. 11 a sorting step 24 precedes one only destination 23a. However, it would also be possible to arrange a sorting step 24 in front of all destinations 23a . . . 23c or also in front of none of them.

In the example shown in FIG. 11 a plurality of material handling elements/nodes K1 . . . K34 are connected to one another directly or indirectly in a ring. Thus at least a part flow is guided in a ring over the said material handling elements/nodes K1 . . . K34. In other words a feedback route is provided. For example node K21 is connected in a ring to node K18, node K32 to node K22, node K34 to node K23 and node K33 to node K21. In this way the ordering of the transported conveyed objects 17 can be increased in several run-throughs, or gaps in the sequence can be filled in step-by-step. The terms "downstream" and "upstream" can be used synonymously in relation to such a ring-like part flow. Of course, the feedback route shown in FIG. 11 is shown simply by way of example and is used to illustrate one of the possibilities. It would of course also be possible to use other ring-like connections.

FIG. 11 also shows several divergences of the flow, for example at nodes K22 . . . K31. In general a divergence can be used to direct an outgoing flow into different areas of a conveying system or to different destinations 23a . . . 23c. In this case a node K22 . . . 101 with several outgoing conveyor segments 3 could also be divided into a node K22 . . . K31 with only one outgoing conveyor segment 3 and a downstream node with several outgoing conveyor segments 3.

Figure 12:
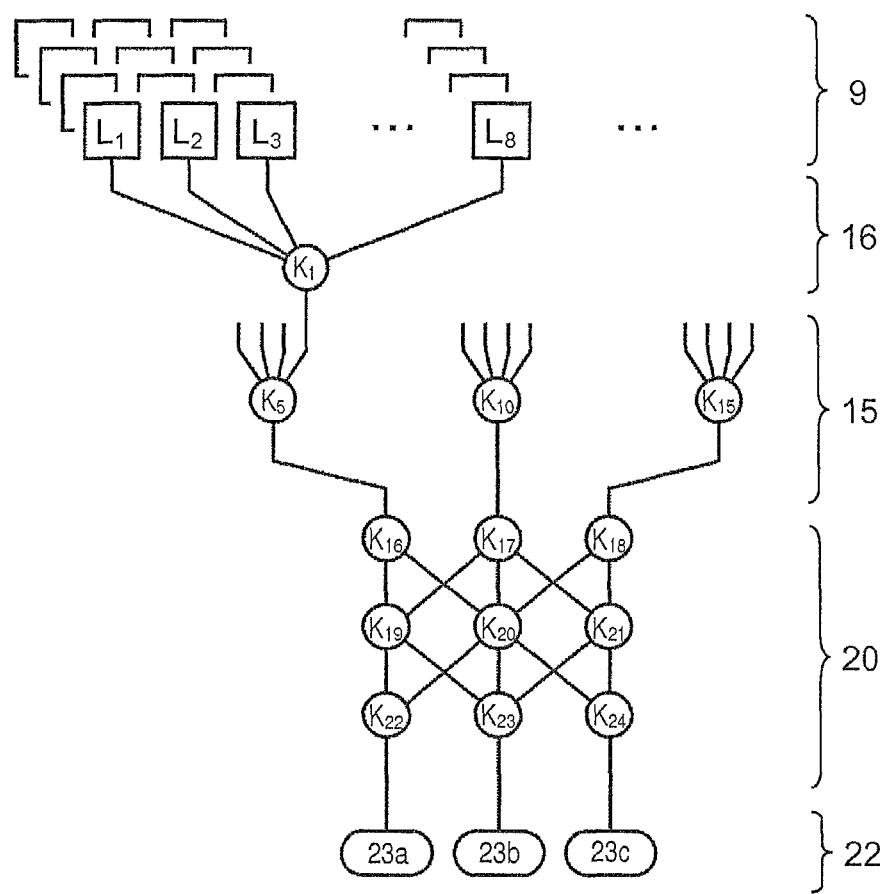
FIG. 12 shows a further example of a slightly more complex conveyor system, but without feedback route and sorting stage.

FIG. 12 shows a structure of an example of a conveying system, which is very similar to the structure shown in FIG. 11. Unlike the latter however, there is no ring-like conveyor, no feedback route and sorting step/sequencer 24. By means of the network 20 however errors in an actual sequence can still be corrected. For example objects, which leave the node K16 can be directed to node K19 or node K20. At node K22 the conveyed objects 17 originating from nodes K19 and K20 can be merged together again. The network can also be used in addition or alternatively to direct the conveyed objects 17 originating from the nodes K16, K17 and K18 to the destinations 23a, 23b and 23c.

Figure 13:
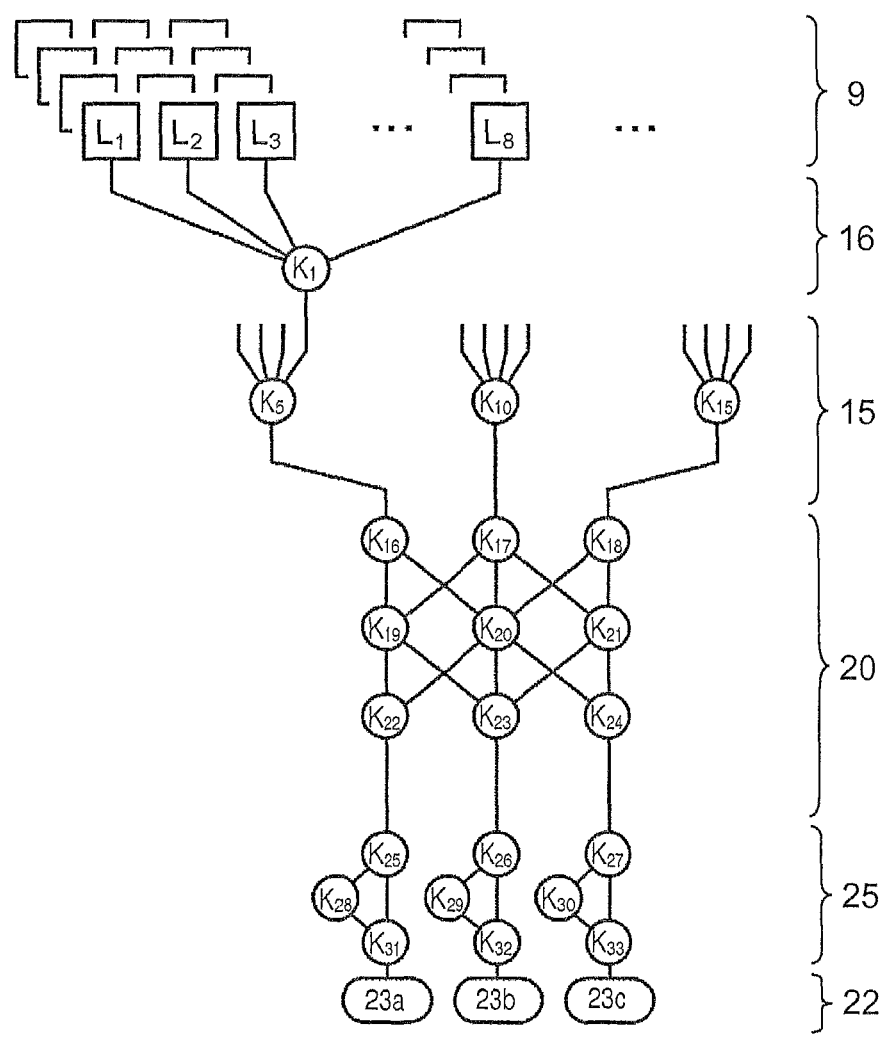
FIG. 13 similar to FIG. 12, but with additional alternative routes.

FIG. 13 shows a further example of a structure of a conveying system, which is very similar to the structure shown in FIG. 12. Unlike the latter however separate alternative routes 25 are provided for correcting errors in a sorting sequence of an incoming flow.

Figure 14:
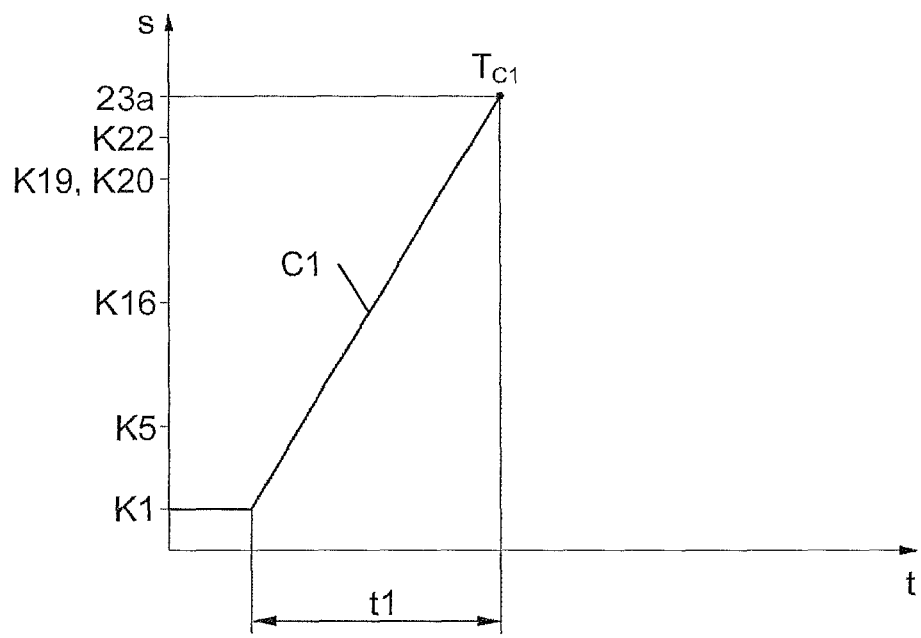
FIG. 14 shows a path-time diagram for a first conveyed object.

The proposed method is now explained in more detail on the basis of the conveying system shown in FIG. 12:

FIG. 14 shows a diagram, in which the path s is represented over time t. Specifically, the shown path runs through nodes K1, K5, K16, K19 or K20 and K22 to the destination 23a. FIG. 14 shows how the conveyed object 17 with serial number C1 moves from node K1 to the destination 23a and arrives after time interval t1 at time point TC1.

Figure 15:
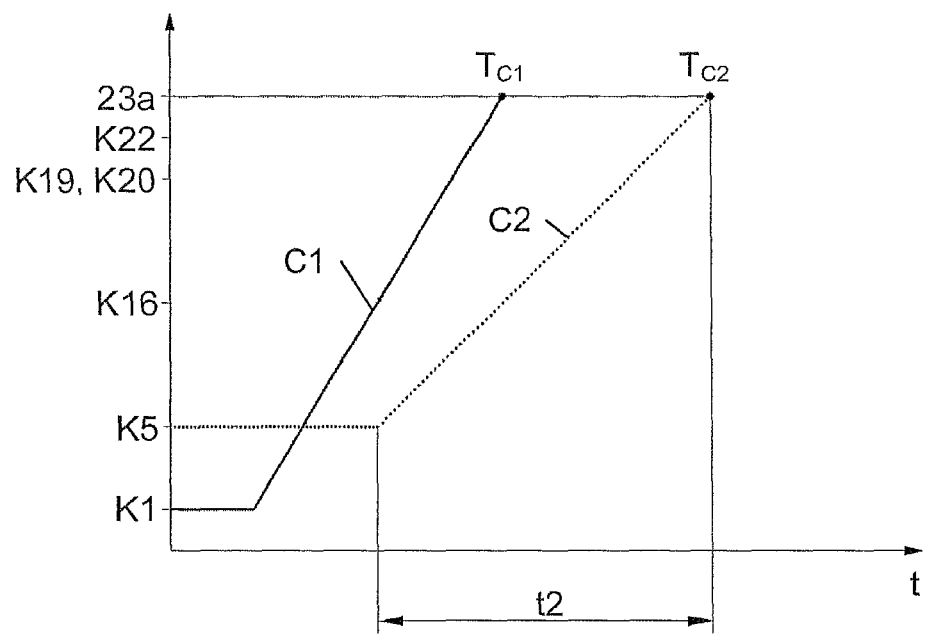
FIG. 15 shows a path-time diagram for an additional conveyed object.

FIG. 15 shows in addition the path of the conveyed object 17 with serial number C2. The latter is released at node K5 and reaches the destination 23a after the time interval t2 at time point TC2. As shown in FIG. 15, the conveyed object 17 with serial number C2 moves slightly slower than the one with serial number C1.

Figure 16:
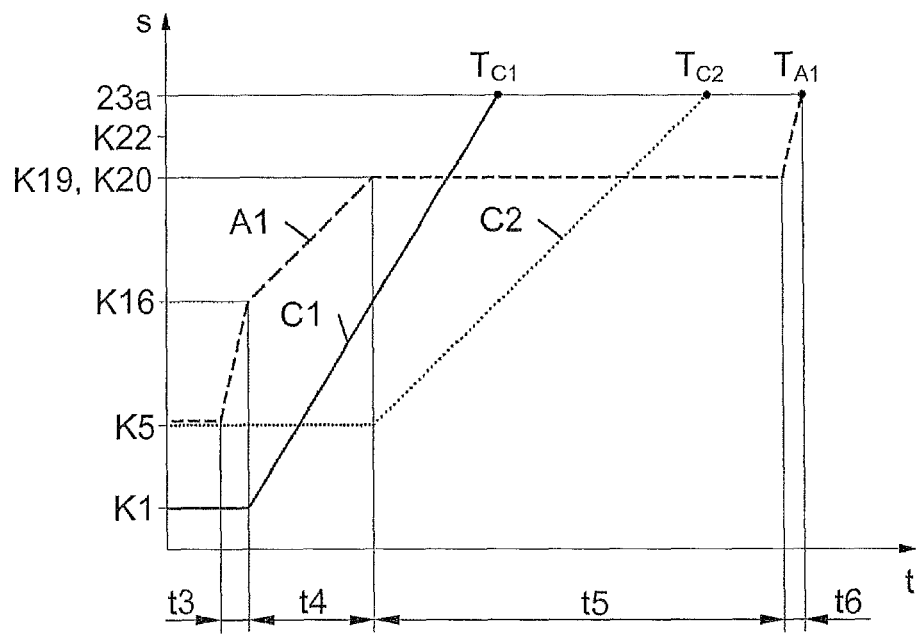
FIG. 16 shows a path-time diagram for another additional conveyed object.

Lastly, FIG. 16 shows the path of the conveyed object 17 with serial number A1. The latter moves from node K5 relatively swiftly to node K16 and then slightly slower to node K20, at which it is held for a time period Finally, it also moves to destination 23a and reaches this at time point TA1. The time required from node K5 to node K16 is denoted by t3, the time required from node K16 to node K20 is denoted by t4, the waiting time at node K20 is denoted by t5 and the time required from node K5 to the destination 23a is denoted by t6.

The path of the conveyed objects 17 through the conveying system is planned in advance. According to the proposed method for bundling conveying streams for the conveyed objects 17 target arrival time points TA1, TC1 and TC2 are calculated, at which the conveyed objects 17 are scheduled to arrive at the destination 23a. Furthermore, for a conveyed object 17 waiting at a material handling element/node K1, K5, K16, K19, K20 and K22 a target run-through time t1, t2, t6 is calculated which the conveyed object 17 needs for scheduled transport from a current position to the destination 23a. The target run-through time of the conveyed object 17 with serial number C1 from node K1 to destination 23a is t1, the target run-through time of the conveyed object 17 with serial number C2 from node K5 to destination 23a is t2, the target run-through time of the conveyed object 17 with serial number A1 from node K5 to node K16 is t3 and so on. A conveyed object 17 is then released at a release time point which corresponds essentially to the target arrival time point TA1, TC1, TC2 minus the target run-through time t1, t2, t3, etc.

According to the plan the target run-through time of the conveyed object 17 with serial number A1 is calculated from node K5 to the destination 23a by t3+t4+t5+t6. The said conveyed object 17 is therefore released at node K5 at time point TA1−(t3+t4+t5+t6), at node K16 at time point TA1−(t4+t5+t6), and at node K20 at time point TA1−t6. For the other conveyed objects 17 the calculation is performed in a similar manner.

By means of the proposed method the conveyed objects 17 arrive at the destination 23a at a predefinable time point TA1, TC1, TC2, provided that the plan is executed without error or with negligible errors.

In particular, the target arrival time points TA1, TC1, TC2 are calculated according to a sorting sequence. In the present example it is assumed that the conveyed objects 17 should arrive at the destination 23a in the sequence C1, C2 and A1. It should be noted at this point that the predefined target arrival time points TA1, TC1, TC2 only represent one of several solutions for the required sequence C1, C2 and A1 and the sequence C1, C2 and A1 can also be achieved by other target arrival time points TA1, TC1, TC2.

Figure 17:
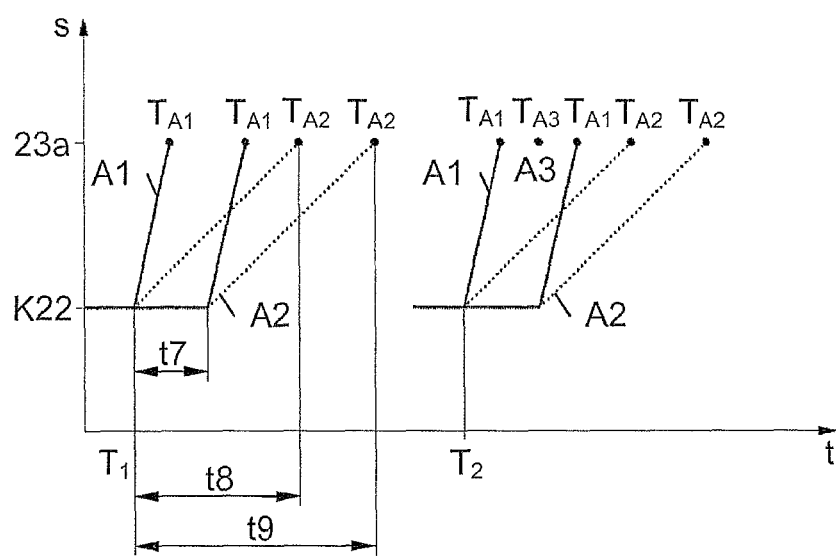
FIG. 17 shows a path-time diagram for conveyed objects with different speeds.

FIG. 17 shows that it is advantageous to release a first conveyed object 17 with the serial number A1 waiting at a material handling element/node K22 after a second conveyed object 17 with serial number A2, which has a target arrival time point TA2 further in the future, as long as the target run-through time for the second conveyed object A2 is longer than for the first conveyed object A1.

The conveyed objects 17 can generally only pass a node Ka, Kb, K1 . . . K34 consecutively with a delay time in between. In the example shown in FIG. 17 this delay time is indicated by t7.

If the conveyed object 17 with serial number A2 is now released at time point T1 and the conveyed object 17 with serial number A1 is released after the delay time t7 (as indicated above), then this results in an occupancy time t8 of the conveyor section between the node K22 and the destination 23a. If however the conveyed object 17 with serial number A1 is released at time point T1 and the conveyed object 17 with serial number A2 is released after the delay time t7, then there is an occupancy time t9 of the conveyor section between the node K22 and the destination 23a which is much longer than the occupancy time t8. By means of the proposed measures thus the occupancy time of a conveyor section can be minimized. It should be noted that the sorting sequence A1→A2 is met by both variants. The former requires less time, as already mentioned. The "occupancy time of the conveyor section" is thus defined in particular as the time interval which a conveyed object 17 needs to run through said conveyor section.

In reality required target release time points cannot always be adhered to. For example, there may be unforeseen disruptions on the conveyor system which delay the movement of the conveyed objects 17 at least on a portion of the conveying system. The right half of FIG. 17 shows an example in which the sorting sequence A1→A2→A3 would be desirable, but the release at node 22 can only start at time point T2.

The above procedure, i.e. the release of conveyed object A2 before conveyed object A1, results in a low occupancy time as discussed, but causes a sorting error, as the conveyed objects 17 arrive in the sequence A3→A1→A2.

In a further advantageous embodiment variant of the proposed method a first conveyed object 17 waiting at a material handling element/node K22 with serial number A1 is released before a second conveyed object 17 with the serial number A2 and a target arrival time point TA2 further in the future, if the target run-through time for the second conveyed object A2 is longer than for the first conveyed object A1 and the first conveyed object A1 thereby arrives at the destination 23a before a third conveyed object A3, the target arrival time point TA3 of which is after the target arrival time point TA2 of the second conveyed object A2. By means of this procedure sorting errors are reduced, as shown on the right of FIG. 17. If the conveyed object A1, as proposed, is released before the conveyed object A2, the conveyed objects 17 arrive at the destination 23a in the sequence A1→A3→A2. Compared to the sorting sequence A3→A1→A2 referred to above the sorting sequence A1→A3→A2 has one sorting error fewer.

The method performed by the controller 5 is explained in more detail in the following with reference to a slightly different illustration:

In a first step the target arrival time points for the conveyed objects 17 are calculated. In the example it is assumed that three destinations 23a . . . 23c are supplied with conveyed objects 17 and thus three target sorting sequences A1 . . . A3, B1 and C1 . . . C3 are formed. This means that the conveyed object 17 should arrive at a first destination 23a in the sequence A1, A2, A3, at a second destination 23b only the conveyed object B2 and at a third destination 23c in the sequence C1, C2, C3. The corresponding target arrival time points are denoted TA1 . . . TA3, TB1 and TC1 . . . TC3. In general said target arrival time points TA1 . . . TA3, TB1 and TC1 . . . TC3 can be saved in a memory or a table of the controller 5 and/or a superordinate controller. In the table in addition also the target run-through times can be saved. Target release time points can also be saved in the table.

FIG. 18 shows the situation at node Kx at a first time point, namely the physical arrangement of several conveyed objects 17 and their assigned target arrival time points TA1 . . . TA3, TB1 and TC1 . . . TC3. In particular, it is assumed in this example that the objects C1, C2 and A1 have already passed node Kx and objects B1 and A2 have been stopped at the node Kx.

In this example it is assumed that the target arrival time point TB1 of the conveyed object 17 with serial number B1 is before the target arrival time point TA2 of the conveyed object 17 with serial number A2. Thus the conveyed object B1 is released before conveyed object A2. In FIG. 19 a situation is shown in which the conveyed object B1 has already passed node Kx, but the conveyed object A2 is still waiting there however.

FIG. 20 shows a situation at a node Ky downstream of node Kx at a later time point. The objects originating from node Kx thereby arrive at the left branch of node Ky. It is now assumed that the objects C1, C2, A1 have already passed node Ky and the objects B1, A2 are also waiting at node Ky. In addition, object C3 is waiting on the right branch.

In this example it is assumed that the target arrival time point TC3 of the conveyed object 17 with serial number C3 is before the target arrival time point TB1 of the conveyed object 17 with serial number B1. Thus the conveyed object C3 is released before conveyed object B1. FIG. 21 shows a situation in which the conveyed object C3 has already passed node Ky, however the conveyed object B1 is still waiting there.

Figure 22:
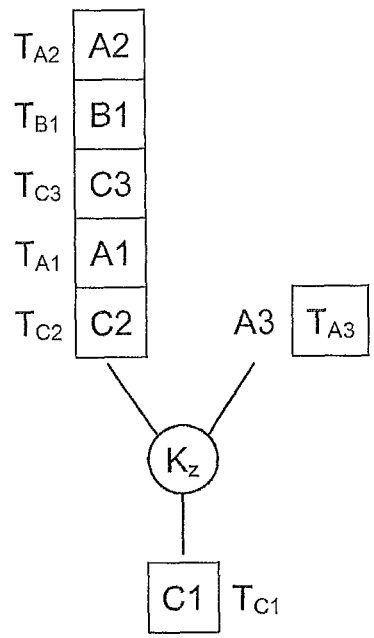
FIG. 22 shows the physical arrangement of several conveyed objects at a third node at a third time point and their assigned target arrival time points.

Furthermore, FIG. 22 shows a situation at a node Kz downstream of Ky at a later time point. The objects coming from node Ky arrive on the left branch of node Kz. It is assumed that the object C1 has already passed node Kz and the objects C2, A1, C3, B1, A2 are still waiting at node Kz. In addition the object A3 is waiting on the right branch of the node Kz.

Figure 23:
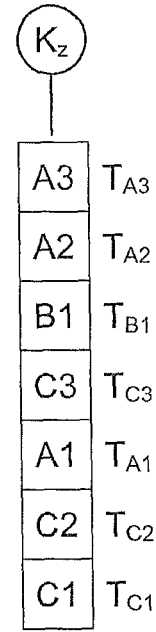
FIG. 23 as FIG. 22, but after conveying the conveyed objects.

In the relevant example it is assumed that the target arrival time point TC2 of the conveyed object 17 with serial number C2 is before the target arrival time point TA3 of the conveyed object 17 with serial number A3. Thus the conveyed object C2 is released before the conveyed object A3. FIG. 23 shows a situation in which all conveyed objects A1 . . . A3, B1, C1 . . . C3 have passed the node Kz and are in the required sequence.

If over the course of the conveying route there is a buffer, a sequencer 24, an alternative route 20, 25 or a feedback route 19, temporary sorting errors can be taken into account specifically in the planning of the conveying sequence. For example it is advantageous if a conveyed object 17 is conveyed into a buffer, a sequencer 24, an alternative route 20, 25 or a feedback route 19 and is stopped there until this position has been passed by a conveyed object 17 preceding the relevant conveyed object 17 in the sorting sequence, if this results in a reduction of the occupancy time of the conveying system.

Figure 24:
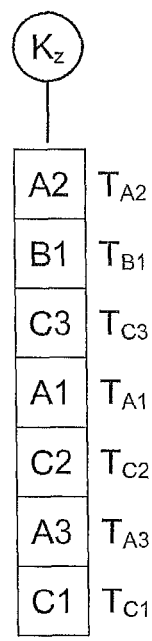
FIG. 24 similar to FIG. 23, but with a sorting error.

FIG. 24 shows in addition a situation after the node Kz, in which the conveyed object 17 with serial number A3 causes a sorting error. To illustrate the proposed method FIGS. 25 to 28 show the removal of the temporary sorting error. For this the conveyed object A3 causing the sorting error is ejected from the object A3 conveyed flow and reintroduced at a later time point.

Figure 25:
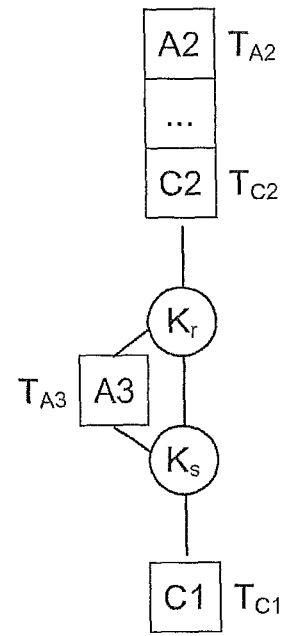
FIG. 25 shows the physical arrangement of several conveyed objects in a situation in which the conveyed object causing an error in a sorting sequence has been transported into an alternative route.
Figure 26:
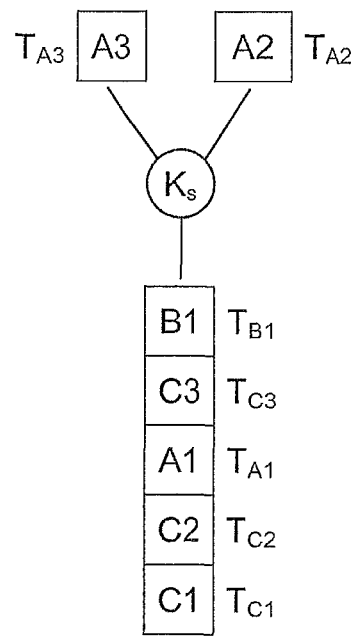
FIG. 26 as FIG. 25, but after conveying several conveyed objects.
Figure 27:
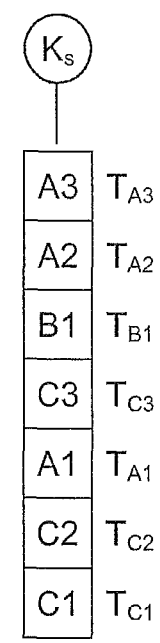
FIG. 27 as FIG. 25, but after conveying all conveyed objects.

In FIG. 25 the object A3 is therefore directed at node Kr into a left branch and stopped at a node Ks, whilst the objects C2, A1, C3, B1 are channeled directly through the node Krs and Ks. At a later time point thus objects A2 and A3 wait at the node Ks. This situation is shown in FIG. 26. FIG. 27 then shows the correct sorting, which also corresponds to the sorting already shown in FIG. 23, but after the node Ks. In the above example the conveyed object A3 has been conveyed into an alternative route. The process is similar if the conveyed object A3 is transported alternatively into a buffer, a sequencer 24 or a feedback route 19.

Figure 28:
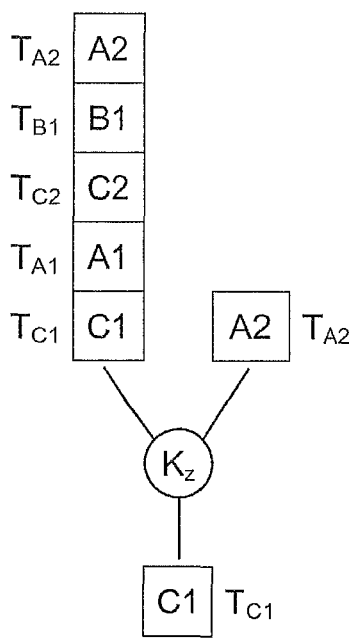
FIG. 28 shows an example of a physical arrangement of a plurality of conveyed objects with partly the same serial number or target arrival time.

FIG. 28 shows a situation in which a plurality of conveyed objects 17 have the same serial number in the sorting sequence. Specifically two objects A2 and two objects C1 are provided. This procedure is practical if a plurality of similar objects need to arrive in a specific position at the destination. For example the objects A2 could be a plurality of similar water bottles, where it does not matter which water bottle is arranged at which possible position for water bottles.

FIG. 28 shows a situation at node Kz, which is comparable to the situation shown in FIG. 22. The objects coming from node Ky enter the left branch of node Kz. It is assumed that the object C1 has already passed the node Kz and an additional object C1 and the objects A1, C2, B1, A2 continue to wait at node Kz. In addition, an additional object A2 is waiting on the right branch of the node Kz.

In principle the target arrival time points TA2 for both conveyed objects A2 can be the same or different. Thus also the target arrival time points TC1 for both conveyed objects C1 can be the same or different. In the present example it is now assumed that the target arrival time points TC1 are before the target arrival time points TA2. Thus at the node Kz the conveyed object 17 with serial number C1 is released. The correction of a sorting error in a buffer, sequencer 24, alternative route 20, 25 or feedback route 19 downstream of the node Kz is also possible in this method variant.

Of course, by means of the proposed method it is possible to remove not only planned sorting errors but also unplanned sorting errors. The latter can be caused for example by disruptions on the conveying system. According to the proposed method a second conveyed object 17, which follows a first conveyed object 17 in a sorting sequence, is conveyed into a buffer, a sequencer 24, an alternative route 20, 25 or a feedback route 19 and held there until this position has been passed by the first conveyed object 17, if the first conveyed object 17 on the conveying system was delayed in an unscheduled manner and no target arrival time point is possible before the target arrival time point of the second conveyed object 17 without using the buffer, the sequencer 24, the alternative route 20, 25 or the feedback route 19.

It is particularly advantageous in this connection if the target arrival time points TA1 . . . TA3, TB1, TC1 . . . TC3 for those conveyed objects 17, which have not yet reached their destination 23a . . . 23b, are recalculated in consideration of the said unscheduled delay. In this way the planning or the further execution of the method is supported by foreseeable circumstances.

It is particularly advantageous if a plurality of variants of target arrival time points TA1 . . . TA3, TB1, TC1 . . . TC3 each having a predefined sorting sequence for a plurality of conveyed objects 17, which have not yet arrived at their destination 23a . . . 23b, are calculated in consideration of the said unscheduled delay and the particular variant is actually executed which has the lowest occupancy time on the conveying system.

It is advantageous if at least those method steps which are related to a decision about the release of a conveyed object 17, apart from the consideration of a target arrival time point TA1 . . . TA3, TB1, TC1 . . . TC3/a target run-through time/a target release time point are performed independently of all other material handling elements/nodes Ka . . . Kz, K1 . . . K34 and/or independently of a central controller. In this way the communication and thus the cost of communication lines between the material handling elements K1 . . . K34 can be minimized.

In this connection it is also an advantage if the programming logic relating to the release of a conveyed object 17 in all material handling elements K1 . . . K34 is configured to be identical, or if the method steps relating to the release of a conveyed object 17 in all material handling elements K1 . . . K34 are performed in an identical manner. In this way the effort of producing or programming the controller for a conveying system can be minimized overall, as the latter is made up of several identical modules. Also the cost of any troubleshooting can be minimized.

To form a predefined sorting sequence it is also an advantage if conveyed objects 17 are removed from storage in order to be supplied with respect to the destinations 23a . . . 23c and with respect to a sorting sequence for a destination 23a . . . 23c. This means that firstly those conveyed objects 17 for a destination 23a . . . 23c are removed from storage with the lowest position in a sequence, then the conveyed objects 17 with the second lowest position etc. In addition, the conveyed objects 17 for a specific destination 23a . . . 23c are also removed from storage in an ordered manner. If for example in the aisle of the storage 9, from which the material handling elements K1 . . . K4 are used for the removal, for example conveyed objects 17 number 3 and number 5 of the target 23a and the conveyed objects 17 number 1 and 7 of the target 23b, the conveyed objects 17 are removed from storage in the sequence A3, A5, B1, B7. In this example, it is assumed that the missing conveyed objects 17 (e.g. A1, A2, A4, B2, B3, etc.) of the sequence are located in other aisles, which are removed from storage by other material handling elements K6 . . . K9, K11 . . . K14. In this way overall it is possible to achieve a higher degree of ordering of the conveying streams provided by the conveying technology.

Alternatively, it would also be possible that the conveyed objects 17 are ordered with regard to a sorting sequence for a destination 23a . . . 23c to be supplied, with respect to the destinations 23a . . . 23c but are removed from the storage 9 chaotically or in an unordered manner. With regard to the previously stated example, this means that the conveyed objects 17 can also be removed from storage for example in the sequence B1, A3, A5, B7 or for example in the sequence B1, A3, B7, A5. By means of the unordered removal from storage at the destination level the throughput during the removal from storage can be increased, for example if transport routes of the material handling elements K1 . . . K15 are minimized during the removal from storage.

In order to identify blockages on the conveying system or remove them, it is also possible in an advantageous embodiment that the releases of the nodes K1 . . . K34 per unit of time are monitored by a superordinate controller and the holding device 4a, 4b is released at which the conveyed object 17 with the lowest serial number is waiting, if a threshold is not met for the releases per unit of time.

For example if the value for the releases per unit of time decreases from a relatively constant value (e.g. 50 releases per minute) to a very low value or even zero, it can be assumed that there is a blockage on the conveying system. By means of superordinate intervention the blockage can be resolved. Instead of releasing the conveyed object 17 with the lowest serial number the release can also be performed randomly for example.

It is also advantageous if the threshold is adjusted according to the number of conveyed objects 17 located on the conveying system. This means that the threshold is increased if the number of transported objects 17 increases and vice versa. In this way a decreasing number of releases, which is substantiated by a low number of transported conveyed objects 17, is not misinterpreted as a blockage.

For example, a situation of this kind may occur when starting a picking order or for example also when the latter is almost complete. In both cases there are comparatively few objects 17 on the conveying system because they are mostly still in the storage 9 or have already been loaded into packaging containers. It is also advantageous if pausing the removal of conveyed objects 17 at a destination 23a . . . 23c. is taken into consideration. Particularly, with manual picking processes there are necessarily interruptions in the working sequence, for example if a worker is taking a break or has gone to the bathroom. In this case there can also be a decrease in the number of releases per unit of time which is not caused by a blockage.

In this connection it is also advantageous if the removal of conveyed objects 17 from the storage 9 is adjusted according to the removal of conveyed objects 17 at the destination 23a . . . 23c. This means that the number of conveyed objects 17 removed per unit of time from the storage is lowered, if the number of conveyed objects 17 removed per unit of time at the destination 23a . . . 23c falls and vice versa.

In one variant of the described method the releases per unit of time for each destination 23a . . . 23c to be supplied are monitored by a superordinate controller. Thus the holding device 4a, 4b is released at which the conveyed object 17 with the lowest target arrival time point TA1 . . . TA3, TB1, TC1 . . . TC3 of the relevant target 23a . . . 23c is waiting, if for the releases per time unit assigned to the relevant destination 23a . . . 23c a threshold is not met.

The controller 5 is generally set up to release a conveyed object 17 at a release time point which corresponds essentially to the target arrival time point TA1 . . . TA3, TB1, TC1 . . . TC3 minus the target run-through time t1, t2, t6. Furthermore, it is also possible that the controller 5 is set up to calculate a target run-through time t1, t2, t6 for a conveyed object 17 waiting at a material handling element/node Ka . . . Kz, K1 . . . K34, which the conveyed object 17 needs for transporting as scheduled from a current position to the destination 23a . . . 23c. Alternatively, this calculation or the calculation of the target release time points can also be performed by a superordinate controller. The calculation of the target arrival time points TA1 . . . TA3, TB1, TC1 . . . TC3 for the conveyed objects 17, at which the latter are to arrive as scheduled at a destination 23a . . . 23c, is advantageously performed by a central or superordinate controller.

It should be noted at this point that the removal of sorting errors explained with reference to FIGS. 24 to 27, whether they are planned or unplanned errors, can be applied without the features of claim 1, that is without the control of the conveyor sequence with reference to the target arrival time points TA1 . . . TA3, TB1, TC1 . . . TC3. Furthermore, another sorting algorithm can be superordinate to the removal of sorting errors.

For example, a plurality of triggering devices downstream of the incoming conveying segments 1a, 1b and linked logically to the OR link are used for the release of a holding device 4a, 4b or a conveyed object 17, and a holding device 4a, 4b or a conveyed object 17 waiting at the latter is released when a conveyed object 17 preceding the waiting conveyed object 17 in a sorting sequence passes one of the linked releasing devices or there is no preceding conveyed object 17.

Figure 29:
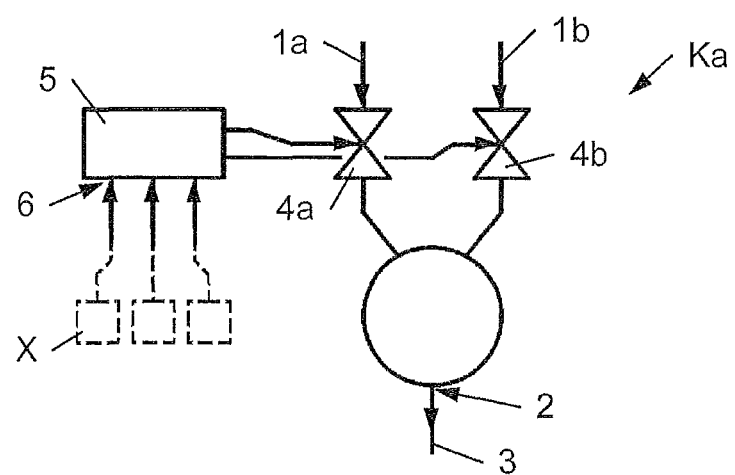
FIG. 29 similar to FIG. 1, but with a controller operating according to a different sorting method and FIG. 30 similar to FIG. 11, but with material handling elements/nodes according to FIG. 19.

FIG. 29 shows similar to FIG. 1 an example of a material handling element Kc for bundling conveying streams, in which the controller 5 is connected on the input side to a plurality of triggering devices X which are arranged downstream of the material handling element/node Kc. A conveyed object 17 with the serial number n is only released in this method if the immediately or directly preceding conveyed object 17 with serial number n−1 passes an OR linked triggering device X, whereby it is possible in principle to form an accurate actual sorting sequence at the destination 23a . . . 23c.

Figure 30:
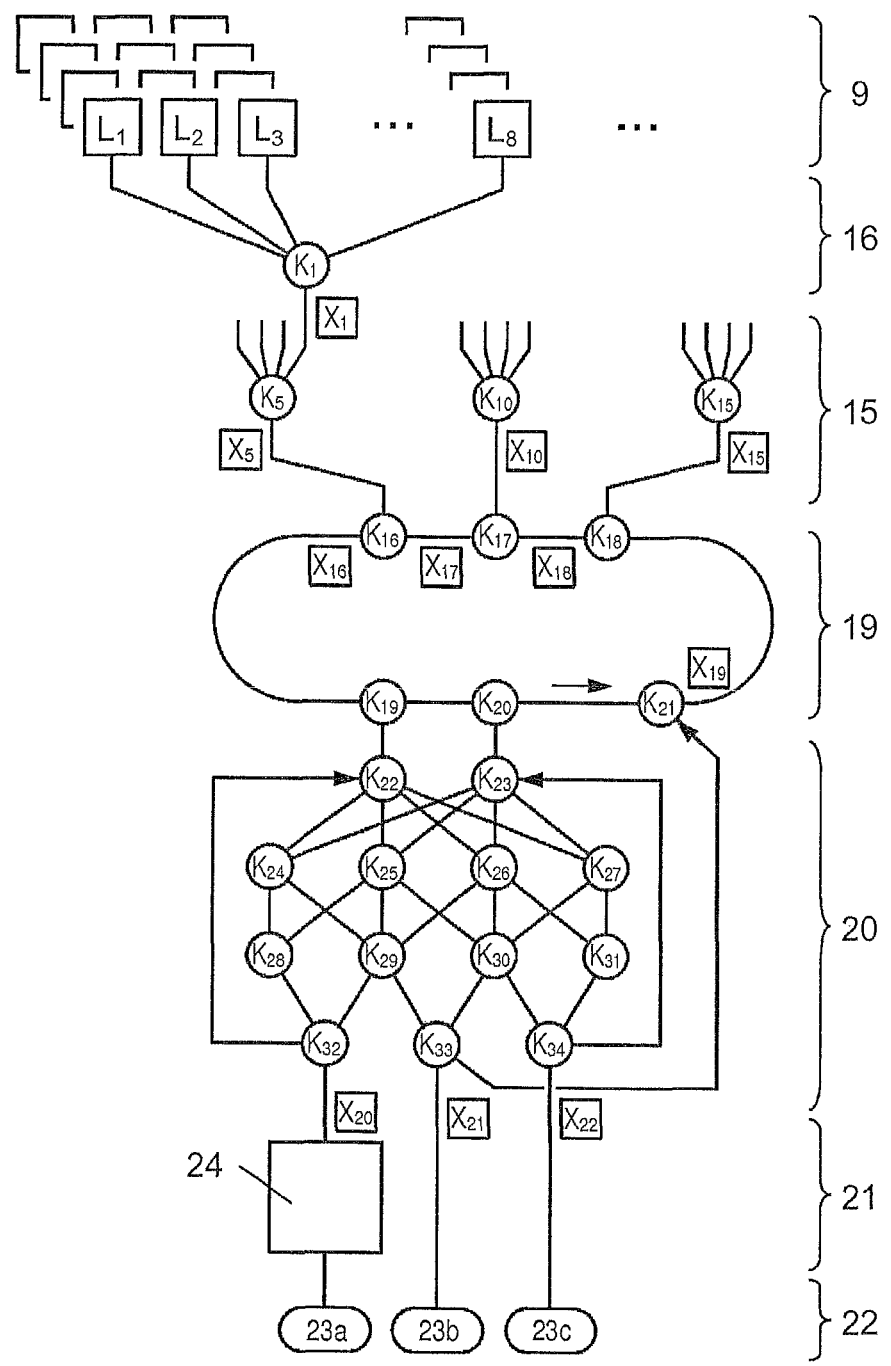

Similar to FIG. 11 FIG. 30 shows an example of how the triggering devices X can be distributed in a conveying system. Specifically in this example a plurality of triggering devices X1 . . . X22 are provided. Here to each shuttle 16 a triggering device X1 . . . X4, X6 . . . X9 and X11 . . . X14 is assigned on the receiving platform and to each lift 15 a triggering device X5, X10 and X15 is assigned on the lifting platform.

It should be noted in particular that the arrangement of the triggering devices X1 . . . X22 is simply shown by way of example in order to illustrate the functioning of the conveying system shown in FIG. 30 and of course can also be different. In particular, no triggering devices X1 . . . X22 are marked in the network 20 for illustrative purposes. In a real system of course triggering devices X1 . . . X22 can be provided at any point in the network 20. Furthermore, it should be noted that the interconnection of the nodes K1 . . . K34 with the triggering devices X1 . . . X22 is also not shown explicitly in FIG. 30, but would of course be present in a real implementation of the conveying system.

For example the triggering devices X5 and X16 can be connected to the inputs 6 of the material handling element K1. For example, the triggering devices X16 . . . X19 can be connected to the material handling element K21. The material handling element K24 can be connected to not shown triggering devices in the network 20 and so on.

It is also possible in connection with this sorting method to allow errors in a sorting sequence and to correct them by means of a buffer, sequencer 24 an alternative route 20, 25 or a feedback route 19 arranged downstream of the material handling element node Ka . . . Kz, K1 . . . K34. It is also possible here that a plurality of conveyed objects 17 have the same serial number in a sorting sequence, such as if similar conveyed objects 17 are to be grouped in a conveying stream.

In summary, it can be said that the method defined according to one aspect of the invention can also be applied independently of the features of another aspect of the invention, in particular in association with another sorting method, wherein further aspects of the invention can also be applied by analogy. This results in a method for bundling conveying streams at a material handling element/node Ka . . . Kz, K1 . . . K34 with a plurality of incoming conveyor segments 1a, 1b, at least one coupling 2 to an outgoing conveyor segment 3, to which the incoming conveyor segments 1a, 1b are merged, and a plurality of holding devices 4a, 4b for stopping conveyed objects 17 or a conveying stream on the incoming conveyor segments 1a, 1b, wherein a conveyed object 17 is conveyed into a buffer, a sequencer 24, an alternative route 20, 25 or a feedback route 19 and is held there, until this position has been passed by a conveyed object 17 preceding the relevant conveyed object 17 in the sorting sequence, if this results in the reduction of the occupancy time of the conveying system.

The result is thus a material handling element/node Ka . . . Kz, K1 . . . K34 for bundling conveying streams comprising a plurality of incoming conveyor segments 1a, 1b, at least one coupling 2 to an outgoing conveyor segment 3, to which the incoming conveyor segments 1a, 1b are merged, and a plurality of holding devices 4a, 4b for stopping a flow on the incoming conveyor segments 1a, 1b, additionally comprising a controller 5, which is configured, to convey a conveyed object 17 into a buffer, a sequencer 24, an alternative route 20, 25 or a feedback route 19 and keep it there until this position has been passed by a conveyed object 17 preceding the relevant conveyed object 17 in the sorting sequence, if this reduces the occupancy time of the conveying system.

Furthermore, also the method according to another aspect of the invention is independent of the features of another aspect of the invention, and can also be applied in particular in connection with another sorting method, wherein further aspects of the invention can also be applied accordingly. This thus results in a method for bundling conveying streams at a material handling element/node Ka . . . Kz, K1 . . . K34 with a plurality of incoming conveyor segments 1a, 1b, at least one coupling 2 to an outgoing conveyor segment 3, to which the incoming conveyor segments 1a, 1b are merged and a plurality of holding devices 4a, 4b for stopping conveyed objects 17 or a flow to the incoming conveyor segments 1a, 1b, wherein a second conveyed object 17, which follows a first conveyed object 17 in a sorting sequence, is conveyed into a buffer, a sequencer 24, an alternative route 20, 25 or a feedback route 19 and is held there until this position has been passed by the first conveyed object 17, if the first conveyed object 17 has been delayed in an unscheduled manner on the conveying system and it is no longer possible to have a target arrival time point before the target arrival time point of the second conveyed object 17 without using the buffer, the sequencer 24, the alternative route 20, 25 or the feedback route 19.

This thus results in a material handling element/node Ka . . . Kz, K1 . . . K34 for bundling conveying streams, comprising a plurality of incoming conveyor segments 1a, 1b, at least one coupling 2 for an outgoing conveyor segment 3, to which the incoming conveyor segments 1a, 1b are merged, and a plurality of holding devices 4a, 4b for stopping a flow on the incoming conveyor segments 1a, 1b, also comprising a controller 5 which is configured to convey a second conveyed object 17, which follows a first conveyed object 17 in a target sorting sequence, into a buffer, a sequencer 24, an alternative route 20, 25 or a feedback route 19 and to hold it there until this position has been passed by the first conveyed object 17, if the first conveyed object 17 has been delayed on the conveying system in an unscheduled manner and the target arrival time point is no longer possible before the target arrival time point of the second conveyed object 17 without using the buffer, the sequencer 24, the alternative route 20, 25 or the feedback route 19.

At this point it should be noted that the combination of some aspects of the invention or the combination of previously mentioned variants (i.e. their and/or link) can be applied independently of the features of another aspect of the invention, and in particular in connection with another sorting method, wherein further aspects of the invention can also be applied by analogy.

Generally, the controller 5 can consist of hardware or can also be in the form of a software algorithm which is performed in a processor. It is also possible that a plurality of entities of the said software algorithm are performed in a computer.

Advantageously, the material handling elements/nodes Ka . . . Kz, K1 . . . K34 have access by writing and/or reading a common table with target arrival time points TA1 . . . TA3, TB1, TC1 . . . TC3. For example the latter can be stored in a central controller. If the controllers 5 are formed by a plurality of entities of a software algorithm in a computer, then the common table can be stored in particular on said computer.

The physical connection between controllers 5, the connection of one controller 5 to a superordinate controller or also the connection of the triggering devices X1 . . . X22 to the controllers 5 is wire-connected or wireless. For example, said connections can be formed by a bus system or by means of a wireless network.

Generally material handling elements K1 . . . K34 with a different release strategy can be used in a conveyor system. For example the material handling elements K1 . . . K15 can be set up to release a conveyed object 17 with the serial number n when one of the preceding conveyed objects 17 with serial number n−1 or n−2 passes one of the OR-linked triggering devices X1 . . . X22, whereas the other material handling elements K16 . . . K34 can be set up for example to perform a release method with the aid of the addressed time control. If necessary, the guide-lines for releasing a conveyed object 17 can also be adjusted dynamically during operation, for example by a superordinate controller.

The embodiments show possible embodiment variants of a material handling element Ka . . . Kz, K1 . . . K34 according to the invention or a conveyor system according to the invention, whereby it should be noted at this point that the invention is not restricted to the embodiment variants shown in particular, but rather various different combinations of the individual embodiment variants are also possible and this variability, due to the teaching on technical procedure, lies within the ability of a person skilled in the art in this technical field. Thus all conceivable embodiment variants are possible, which are formed by combining individual details of the embodiment variants shown and described.

In particular it should be noted that the shown devices in reality can also comprise more components than are shown.

Lastly, as a point of formality it should be noted that for a better understanding of the structure of a material handling element Ka . . . Kz, K1 . . . K34 or a conveyor system according to the invention the latter or its components have not been shown to scale in part and/or have been enlarged and/or have been reduced in size.

The independent solutions according to the invention can be taken from the description.

LIST OF REFERENCE NUMERALS

1*a*, 1*b* incoming conveyor segment
2 coupling for outgoing conveyor segment
3 outgoing conveyor segment
4*a*, 4*b* holding device
5 controller
6 input
7*a*, 7*b* sensor/reading device
8 output line
9 storage
10 storage and retrieval machine
11 rails
12 car
13 mast
14 lifting platform
15 lift
16 conveyor vehicle ("shuttle")
17 conveyed object
18 paternoster
19 loop
20 network
21 sorting area
22 picking area
23*a* . . . 23*c* destination
sorting step
alternative route
A1 . . . A3 serial number conveyed object first destination
B1 serial number conveyed object second destination
C1 . . . C3 serial number conveyed object third destination
K1 . . . K34 material handling element/node
L, L1 . . . L8, Lv storage space
X, X1 . . . X22 triggering device

The invention claimed is:

1. A method for merging conveying streams at a material handling element with a plurality of incoming conveyor segments, at least one coupling to an outgoing conveyor segment, to which the incoming conveyor segments are merged, and a plurality of retainers configured to stop a conveying stream on the incoming conveyor segments, comprising:
   calculating with a controller for conveyed objects target arrival time points when the conveyed objects are scheduled to arrive at a destination,
   calculating with the controller for a conveyed object of the conveyed objects waiting at a material handling element a target run-through time needed for transport of the conveyed object as scheduled from a current position to the destination and
   releasing the conveyed object at a release time point which corresponds essentially to the target arrival time point minus the target run-through time.

2. The method as claimed in claim 1, wherein the target arrival time points are calculated with the controller according to a sorting sequence of the conveyed objects.

3. The method as claimed in claim 1, wherein a first conveyed object with a first target arrival time point of the target arrival time points waiting at a material handling element is released after a second conveyed object with a second target arrival time point of the target arrival time points further in the future, if the target run-through time for the second conveyed object is longer than for the first conveyed object.

4. The method as claimed in claim 1, wherein a first conveyed object with a first target arrival time point of the target arrival time points waiting at a material handling element is released before a second conveyed object with a second target arrival time point of the target arrival time points further in the future, if the target run-through time for the second conveyed object is longer than for the first conveyed object and the first conveyed object thereby arrives at the destination before a third conveyed object with a third target arrival time point of the target arrival time points after the second target arrival time point of the second conveyed object.

5. The method as claimed in claim 1, wherein a plurality of conveyed objects arrive at an identical target arrival time point of the target arrival time points as scheduled at the destination.

6. The method as claimed in claim 1, wherein the at least one coupling for an outgoing conveyor segment of a first material handling element is connected directly or indirectly to the incoming conveyor segment of a second material handling element forming a conveyor system of material handling elements.

7. The method as claimed in claim 1, further comprising:
generating with the controller a predefined sorting sequence for a plurality of the conveyed objects,
calculating with the controller before removing the conveyed objects (17) from a storage a plurality of variants of the target arrival time points maintaining the predefined sorting sequence for the plurality of the conveyed objects and
executing with the controller a particular variant of the plurality of variants which has a lowest occupancy time of a conveying system.

8. The method as claimed in claim 1, wherein a second conveyed object of the conveyed objects is conveyed into a buffer, a sequencer, an alternative route or a feedback route and is held in a position there, until the position has been passed by a first conveyed object of the conveyed objects preceding the second conveyed object in a sorting sequence, if holding the second conveyed object results in a reduction of occupancy time of a conveying system.

9. The method as claimed in claim 1, wherein the material handling element comprises a robot.

10. The method as claimed in claim 1, wherein conveyed objects are removed from a storage in an ordered manner with respect to a plurality of destinations and with respect to a sorting sequence for a destination of the destinations to be supplied.

11. The method as claimed in claim 1, wherein conveyed objects are removed from a storage in an ordered manner with respect to a sorting sequence for the destination to be supplied, but chaotically with respect to a plurality of the destinations.

12. The method as claimed in claim 1, wherein releases per unit of time are monitored by a superordinate controller and a particular retainer of the plurality of retainers is released, at which a conveyed object of the conveyed objects with a lowest target arrival time point of the target arrival time points is waiting, if a threshold is not met for the releases per unit of time.

13. The method as claimed in claim 1, wherein releases per unit of time to each destination of a plurality of destinations to be supplied are monitored by a superordinate controller and a particular retainer of the plurality of retainers is released, at which a conveyed object of the conveyed objects with a lowest target arrival time point of the target arrival time points of a respective destination of the plurality of destinations to be supplied is waiting, if a threshold is not met for the releases per unit of time assigned to the respective destination (23a ... 23c).

14. The method as claimed in claim 6, wherein the first and the second material handling elements of the conveyor system have access to a common table of the target release time points.

15. The method as claimed in claim 6, wherein at least method steps, which are related to a decision about releasing a conveyed object apart from taking into account the target arrival time point/the target run-through time/the target release time point are performed independently of all other material handling elements and/or independently of a central controller.

16. The method as claimed in claim 6, wherein method steps are performed identically with respect to releasing a conveyed object of the conveyed objects in all material handling elements.

17. The method as claimed in claim 6, wherein the first and the second material handling elements of the conveyor system have access to a common table of the target arrival time points.

18. The method as claimed in claim 17, wherein the common table also contains the target run-through times.

19. The method as claimed in claim 6, wherein a second conveyed object (17), with a second target arrival time point of the target arrival points following a first conveyed object in a sorting sequence is conveyed into a buffer, a sequencer, an alternative route or a feedback route and is held in a position there until the position has been passed by the first conveyed object with a first target arrival time point of the target arrival points, if the first conveyed object has been subjected to an unscheduled delay on the conveying system and it is no longer possible to have the first target arrival time point before the second target arrival time point of the second conveyed object without using the buffer, the sequencer, the alternative route or the feedback route.

20. The method as claimed in claim 19, wherein the target arrival time points for the conveyed objects not yet arriving at the destination, are recalculated with the controller in consideration of the unscheduled delay.

21. The method as claimed in claim 20, further comprising:
calculating with the controller a plurality of variants of target arrival time points maintaining a predefined sorting sequence for a plurality of conveyed objects not yet reaching the destination in consideration of the unscheduled delay and a particular variant of the plurality of variants is executed which has a lowest occupancy time of the conveyor system.

22. A conveyor system, comprising a plurality of material handling elements, a material handling element of the plurality of material handling elements comprising:
a plurality of incoming conveyor segments,
at least one coupling for an outgoing conveyor segment, to which the incoming conveyor segments are merged,
a plurality of retainers configured to stop a flow on the incoming conveyor segments,
a controller which is configured to release a conveyed object at a release time point essentially corresponding to a target arrival time point when the conveyed object arrives as scheduled at a target destination minus a target run-through time needed for transport of the conveyed object from a current position to the target destination, and
wherein at least one coupling for an outgoing conveyor segment of one of the material handling elements is connected directly or indirectly to an incoming conveyor segment of another of the material handling elements.

23. The conveyor system as claimed in claim 22, wherein a program logic is designed to be identical with regard to the release of a conveyed object of the conveyed objects in all the material handling elements.

24. A material handling element merging conveying streams, comprising
a plurality of incoming conveyor segments,
at least one coupling for an outgoing conveyor segment, to which the incoming conveyor segments are merged,
a plurality of retainers configured to stop a flow on the incoming conveyor segments, and
a controller which is configured to release a conveyed object at a release time point corresponding to a target arrival time point when the conveyed object arrives as scheduled at a target destination, minus a target run-through time needed for transport of the conveyed object from a current position to the target destination.

* * * * *